US012549726B2

(12) United States Patent
Zhao et al.

(10) Patent No.: US 12,549,726 B2
(45) Date of Patent: *Feb. 10, 2026

(54) POSITION DEPENDENT SPATIAL VARYING TRANSFORM FOR VIDEO CODING

(71) Applicant: Huawei Technologies Co., Ltd., Guangdong (CN)

(72) Inventors: Yin Zhao, Shenzhen (CN); Haitao Yang, Shenzhen (CN); Jianle Chen, San Diego, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/418,698

(22) Filed: Jan. 22, 2024

(65) Prior Publication Data
US 2024/0244205 A1 Jul. 18, 2024

Related U.S. Application Data

(63) Continuation of application No. 17/742,903, filed on May 12, 2022, now Pat. No. 11,917,152, which is a (Continued)

(51) Int. Cl.
H04N 19/61 (2014.01)
H04N 19/12 (2014.01)
(Continued)

(52) U.S. Cl.
CPC ........... *H04N 19/12* (2014.11); *H04N 19/147* (2014.11); *H04N 19/176* (2014.11); *H04N 19/61* (2014.11); *H04N 19/625* (2014.11); *H04N 19/96* (2014.11)

(58) Field of Classification Search
None
See application file for complete search history.

(56) References Cited

U.S. PATENT DOCUMENTS 11,252,426 B2    2/2022  Zhao et al.
11,917,152 B2 *  2/2024  Zhai ...................... H04N 19/17
(Continued)

FOREIGN PATENT DOCUMENTS

CN    101668205 A    3/2010
CN    102131093 A    7/2011
(Continued)

OTHER PUBLICATIONS

Zhang, C., et al., "Video coding using Variable Block-Size Spatially Varying Transforms," ICASSP 2009, XP031459377, Apr. 19, 2009, p. 905-908.
(Continued)

*Primary Examiner* — Christopher G Findley
(74) *Attorney, Agent, or Firm* — Conley Rose, P.C.

(57) ABSTRACT

A mechanism for position dependent spatial varying transform (SVT) for video coding. A prediction block and a corresponding transformed residual block are received at a decoder. A type of spatial varying transform (SVT) employed to generate the transformed residual block is determined. A position of the SVT relative to the transformed residual block is also determined. An inverse of the SVT is applied to the transformed residual block to reconstruct a reconstructed residual block. The reconstructed residual block is then combined with the prediction block to reconstruct an image block.

19 Claims, 14 Drawing Sheets

Related U.S. Application Data continuation of application No. 16/838,948, filed on Apr. 2, 2020, now Pat. No. 11,388,402, which is a continuation of application No. PCT/US2019/016479, filed on Feb. 4, 2019.

(60) Provisional application No. 62/634,613, filed on Feb. 23, 2018.

(51) Int. Cl.
*H04N 19/147* (2014.01)
*H04N 19/176* (2014.01)
*H04N 19/625* (2014.01)
*H04N 19/96* (2014.01)

(56) References Cited

U.S. PATENT DOCUMENTS

| | | |
|---|---|---|
| 2003/0113026 A1 | 6/2003 | Srinivasan et al. |
| 2003/0156648 A1 | 8/2003 | Holcomb et al. |
| 2008/0232705 A1 | 9/2008 | Sohn et al. |
| 2011/0170594 A1 | 7/2011 | Budagavi et al. |
| 2012/0008683 A1 | 1/2012 | Karczewicz et al. |
| 2012/0099642 A1 | 4/2012 | Sole et al. |
| 2012/0128074 A1 | 5/2012 | Zhang et al. |
| 2013/0315302 A1 | 11/2013 | Lim et al. |
| 2014/0056347 A1 | 2/2014 | Xu et al. |
| 2014/0119455 A1 | 5/2014 | Kobayashi |
| 2014/0146891 A1 | 5/2014 | Chuang et al. |
| 2014/0226721 A1 | 8/2014 | Joshi et al. |
| 2014/0241424 A1 | 8/2014 | Oh et al. |
| 2014/0286591 A1 | 9/2014 | Cheon et al. |
| 2015/0110180 A1 | 4/2015 | An et al. |
| 2015/0350682 A1 | 12/2015 | Zhang et al. |
| 2016/0219290 A1 | 7/2016 | Zhao et al. |
| 2017/0094313 A1 | 3/2017 | Zhao et al. |
| 2017/0366824 A1 | 12/2017 | Hsu |
| 2018/0115775 A1 | 4/2018 | Song et al. |
| 2018/0376150 A1 | 12/2018 | Iwamura et al. |
| 2019/0222843 A1 | 7/2019 | Lee |
| 2020/0021810 A1 | 1/2020 | Li et al. |
| 2020/0036992 A1* | 1/2020 | Lim .................... H04N 19/119 |
| 2020/0186838 A1 | 6/2020 | Zhao et al. |

FOREIGN PATENT DOCUMENTS

| | | |
|---|---|---|
| CN | 102165771 A | 8/2011 |
| CN | 102986215 A | 3/2013 |
| CN | 103108181 A | 5/2013 |
| CN | 103152563 A | 6/2013 |
| CN | 103370939 A | 10/2013 |
| CN | 103518374 A | 1/2014 |
| CN | 103561263 A | 2/2014 |
| CN | 103581676 A | 2/2014 |
| CN | 103716623 A | 4/2014 |
| CN | 103997650 A | 8/2014 |
| CN | 103999460 A | 8/2014 |
| CN | 104125466 A | 10/2014 |
| CN | 104735451 A | 6/2015 |
| CN | 104853217 A | 8/2015 |
| CN | 104935927 A | 9/2015 |
| CN | 105530518 A | 4/2016 |
| CN | 106254870 A | 12/2016 |
| CN | 106488242 A | 3/2017 |
| CN | 107211144 A | 9/2017 |
| EP | 2755388 A1 | 7/2014 |
| JP | 2012532561 A | 12/2012 |
| JP | 2014535247 A | 12/2014 |
| KR | 20130098465 A | 9/2013 |
| KR | 20170107452 A | 9/2017 |
| WO | 2010116268 A1 | 10/2010 |
| WO | 2014011894 A1 | 1/2014 |
| WO | 2015172337 A1 | 11/2015 |
| WO | 2017131233 A1 | 8/2017 |
| WO | 2017171370 A1 | 10/2017 |
| WO | 2019076290 A1 | 4/2019 |

OTHER PUBLICATIONS

Zhang, C., et al., "Video Coding Using Spatially Varying Transform," PSIVT 2009, LNCS 5414, XP047468398, 2009, pp. 796-806.

An, J., et al., "Non-CE7: Boundary Dependent Transform for Inter Predicted Residue," Joint Collaborative Team on Video Coding (JCT-VC) of ITU-T SG16 WP3 and ISO/IEC JTC1/SC29/WG11, No. JCTVC-G281, 7th Meeting: Geneva, CH., XP030110265, Nov. 21-30, 2011, 11 pages.

Zhao, Y., "CE6: Spatially Varying Transform (Test 6.1.12.1)," Joint Video Experts Team (JVET) of ITU-T SG 16 WP 3 and ISO/IEC JTC 1/SC 29/WG 11, JVET-K0139-v3, 11th Meeting: Ljubljana, SI, XP030199419, Jul. 10-18, 2018, 11th Meeting: Ljubljana, SI, 7 pages.

Zhao, X., et al., "Enhanced Multiple Transform for Video Coding," Data Compression Conference (DCC), IEEE, XP033027689, Mar. 30, 2016, p. 73-82.

Zhang, C., et al., "Video Coding Using Spatially Varying Transform," IEEE Trans. Image Process., vol. 21, No. 2, Feb. 2011, pp. 127-140.

"Series H: Audiovisual and Multimedia Systems, Infrastructure of audiovisual services—Coding of moving video, High efficiency video coding," ITU-T H.265, Dec. 2016, 664 pages.

Document: JVET-J0025 v2, Chen H et al:"Description of SDR, HDR and 360° video coding technology proposal by Huawei, GoPro, HiSilicon, and Samsung", buJoint Video Exploration Team (JVET) of ITU-T SG 16 WP 3 and ISO/IEC JTC 1/SC 29/WG 11 10th Meeting: San Diego, US, Apr. 10-20, 2018, XP030261338, total 135 pages.

Kemal Ugur et al., "Description of video coding technology proposal by Tandberg, Nokia, Ericsson," Joint Collaborative 1 Team on Video Coding (JCT-VC) of ITU-T SG16 WP3 and ISO/IEC JTC1/SC29/WG11, JCTVC-A119, 1st Meeting: Dresden, DE, Apr. 15-23, 2010, total 33 pages.

* cited by examiner

100
POSITION DEPENDENT SPATIAL VARYING TRANSFORM FOR VIDEO CODING

CROSS-REFERENCE TO RELATED APPLICATIONS

The present application is a continuation of U.S. patent application Ser. No. 17/742,903 filed May 12, 2022, which is a continuation of U.S. patent application Ser. No. 16/838,948 filed Apr. 2, 2020, now U.S. Pat. No. 11,388,402, which is a continuation of International Application No. PCT/US2019/016479 filed Feb. 4, 2019, which claims the benefit of U.S. Provisional Patent Application No. 62/634,613, filed Feb. 23, 2018, and the respective teachings and disclosures of which are hereby incorporated in their entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Video coding is the process of compressing video images into smaller formats. Video coding allows encoded video to take up less space when stored on a medium. Further, video coding supports streaming media. Specifically, content providers wish to provide media to end users in ever higher definition. Further, content providers wish to provide media on demand without forcing a user to wait for extended periods for such media to be transmitted to end user devices, such as televisions, computers, tablets, phones, etc. Advances in video coding compression support reduction in the size of video files, and hence support both of the abovementioned goals when applied in conjunction with corresponding content distribution systems.

SUMMARY

A first aspect relates to a method implemented in a computing device. The method includes parsing, by a processor of the computing device, a bitstream to obtain a prediction block and a transformed residual block corresponding to the prediction block, determining, by the processor, a type of spatial varying transform (SVT) that was used to generate the transformed residual block, determining, by the processor, a position of the SVT relative to the transformed residual block, determining, by the processor, an inverse of the SVT based on the position of the SVT, applying, by the processor, the inverse of the SVT to the transformed residual block to produce a reconstructed residual block, and combining, by the processor, the reconstructed residual block with the prediction block to reconstruct an image block.

The method facilitates an increase in the coding efficiency of SVT. In that regard, a transform block is positioned at various candidate positions relative to a corresponding residual block. As such, the disclosed mechanisms employ different transforms for transform blocks based on candidate position.

In a first implementation form of the method according to the first aspect as such, the type of the SVT is a SVT vertical (SVT-V) type or a SVT horizontal (SVT-H) type.

In a second implementation form of the method according to the first aspect as such or any preceding implementation form of the first aspect, the SVT-V type includes a height that equals a height of the transformed residual block and a width that is half a width of the transformed residual block, and the SVT-H type includes a height that is half the height of the transformed residual block and a width that is equal to a width of the transformed residual block.

In a third implementation form of the method according to the first aspect as such or any preceding implementation form of the first aspect, an svt_type_flag is parsed from the bitstream to determine a type of the SVT.

In a fourth implementation form of the method according to the first aspect as such or any preceding implementation form of the first aspect, a type of SVT is determined by inference when only one type of SVT is allowed for the residual block.

In a fifth implementation form of the method according to the first aspect as such or any preceding implementation form of the first aspect, a position index is parsed from the bitstream to determine a position of the SVT.

In a sixth implementation form of the method according to the first aspect as such or any preceding implementation form of the first aspect, a position index contains a binary code indicating the position from a set of candidate positions determined according to a candidate position step size (CPSS).

In a seventh implementation form of the method according to the first aspect as such or any preceding implementation form of the first aspect, a most probable position of the SVT is assigned a least number of bits in the binary code indicating the position index.

In an eighth implementation form of the method according to the first aspect as such or any preceding implementation form of the first aspect, a position of the SVT is inferred by the processor when a single candidate position is available for the SVT transform.

In a ninth implementation form of the method according to the first aspect as such or any preceding implementation form of the first aspect, a position of the SVT is inferred by the processor when the residual block was generated by template matching in an inter-prediction mode.

In a tenth implementation form of the method according to the first aspect as such or any preceding implementation form of the first aspect, an inverse Discrete Sine Transform (DST) is employed for a SVT vertical (SVT-V) type transform positioned at a left boundary of the residual block.

In an eleventh implementation form of the method according to the first aspect as such or any preceding implementation form of the first aspect, an inverse DST is employed for a SVT horizontal (SVT-H) type transform positioned at a top boundary of the residual block.

In twelfth implementation form of the method according to the first aspect as such or any preceding implementation form of the first aspect, an inverse Discrete Cosine Transform (DCT) is employed for a SVT-V type transform positioned at a right boundary of the residual block.

In a thirteenth implementation form of the method according to the first aspect as such or any preceding implementation form of the first aspect, an inverse DCT is employed for a SVT-H type transform positioned at a bottom boundary of the residual block.

In a fourteenth implementation form of the method according to the first aspect as such or any preceding implementation form of the first aspect, samples in the reconstructed residual block are horizontally flipped prior to combining the reconstructed residual block with the prediction block when a right side neighbor of a coding unit associated with the reconstructed residual block has been reconstructed and a left side neighbor of the coding unit has not been reconstructed.

A second aspect relates to a method implemented in a computing device. The method includes receiving a video signal from a video capture device, the video signal including an image block, generating, by a processor of the computing device, a prediction block and a residual block to represent the image block, selecting, by the processor, a transform algorithm for a spatial varying transform (SVT) based on a position of the SVT relative to the residual block, converting, by the processor, the residual block into a transformed residual block using the SVT that was selected, encoding, by the processor, a type of the SVT into a bitstream, encoding, by the processor, a position of the SVT into the bitstream, and encoding, by the processor, the prediction block and the transformed residual block into the bitstream for transmission to a decoder.

The method facilitates an increase in the coding efficiency of SVT. In that regard, a transform block is positioned at various candidate positions relative to a corresponding residual block. As such, the disclosed mechanisms employ different transforms for transform blocks based on candidate position.

In a first implementation form of the method according to the first aspect as such, the type of the SVT is a SVT vertical (SVT-V) type or a SVT horizontal (SVT-H) type.

In a second implementation form of the method according to the second aspect as such or any preceding implementation form of the second aspect, the SVT-V type includes a height that equals a height of the residual block and a width that is half a width of the residual block.

In a third implementation form of the method according to the second aspect as such or any preceding implementation form of the second aspect, the SVT-H type includes a height that is half the height of the residual block and a width that is equal to a width of the residual block.

In a fourth implementation form of the method according to the second aspect as such or any preceding implementation form of the second aspect, the position of the SVT is encoded in a position index.

In a fifth implementation form of the method according to the second aspect as such or any preceding implementation form of the second aspect, a position index contains a binary code indicating the position from a set of candidate positions determined according to a candidate position step size (CPSS).

In a sixth implementation form of the method according to the second aspect as such or any preceding implementation form of the second aspect, a most probable position of the SVT is assigned as a least number of bits in the binary code indicating the position index.

In a seventh implementation form of the method according to the second aspect as such or any preceding implementation form of the second aspect, a Discrete Sine Transform (DST) algorithm is employed by the processor for a SVT vertical (SVT-V) type transform positioned at a left boundary of the residual block.

In an eighth implementation form of the method according to the second aspect as such or any preceding implementation form of the second aspect, a DST algorithm is selected by the processor for a SVT horizontal (SVT-H) type transform positioned at a top boundary of the residual block.

In a ninth implementation form of the method according to the second aspect as such or any preceding implementation form of the second aspect, a Discrete Cosine Transform (DCT) algorithm is selected by the processor for a SVT-V type transform positioned at a right boundary of the residual block.

In a tenth implementation form of the method according to the second aspect as such or any preceding implementation form of the second aspect, a DCT algorithm is selected by the processor for a SVT-H type transform positioned at a bottom boundary of the residual block.

In an eleventh implementation form of the method according to the second aspect as such or any preceding implementation form of the second aspect, the method further includes horizontally flipping, by the processor, samples in the residual block prior converting, by the processor, the residual block into the transformed residual block when a right side neighbor of a coding unit associated with the residual block has been encoded and a left side neighbor of the coding unit has not been encoded.

A third aspect relates to a coding apparatus that includes a receiver configured to receive a picture to encode or to receive a bitstream to decode, a transmitter coupled to the receiver, the transmitter configured to transmit the bitstream to a decoder or to transmit a decoded image to a display, a memory coupled to at least one of the receiver or the transmitter, the memory configured to store instructions, and a processor coupled to the memory, the processor configured to execute the instructions stored in the memory to perform the method of any of the preceding aspects or implementations.

The coding apparatus facilitates an increase in the coding efficiency of SVT. In that regard, a transform block is positioned at various candidate positions relative to a corresponding residual block. As such, the disclosed mechanisms employ different transforms for transform blocks based on candidate position.

In a first implementation form of the apparatus according to the third aspect as such, the apparatus further includes a display configured to display an image.

A fourth aspect relates to a system that includes an encoder and a decoder in communication with the encoder. The encoder or the decoder includes the coding apparatus of any of the preceding aspects or implementations.

The system facilitates an increase in the coding efficiency of SVT. In that regard, a transform block is positioned at various candidate positions relative to a corresponding residual block. As such, the disclosed mechanisms employ different transforms for transform blocks based on candidate position.

A fifth aspect relates to a means for coding that includes receiving means configured to receive a picture to encode or to receive a bitstream to decode, transmission means coupled to the receiving means, the transmission means configured to transmit the bitstream to a decoder or to transmit a decoded image to a display means, storage means coupled to at least one of the receiving means or the transmission means, the storage means configured to store instructions, and processing means coupled to the storage means, the processing means configured to execute the instructions stored in the storage means to perform the methods in any of the preceding aspects or implementations.

The means for coding facilitates an increase in the coding efficiency of SVT. In that regard, a transform block is positioned at various candidate positions relative to a corresponding residual block. As such, the disclosed mechanisms employ different transforms for transform blocks based on candidate position.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The standard now known as High Efficiency Video Coding (HEVC) is an advanced video coding system developed under the Joint Collaborative Team on Video Coding (JCT-VC) group of video coding experts from the International Telecommunication Union-Telecommunication Standardization Sector (ITU-T) Study Group. Details regarding the HEVC standard are found in ITU-T Rec. H.265 and International Organization for Standardization (ISO)/International Electrotechnical Commission (IEC) 23008-2 (2013), High efficiency video coding, final draft approval January 2013 (formally published by ITU-T in June, 2013, and in ISO/IEC in November 2013), which is incorporated herein by reference. An overview of HEVC is found in G. J. Sullivan, J.-R. Ohm, W.-J. Han, and T. Wiegand, "Overview of the High Efficiency Video Coding (HEVC) Standard", IEEE Trans. Circuits and Systems for Video Technology, Vol. 22, No. 12, pp. 1649-1668, December 2012, which is incorporated herein by reference.

Figure 1:
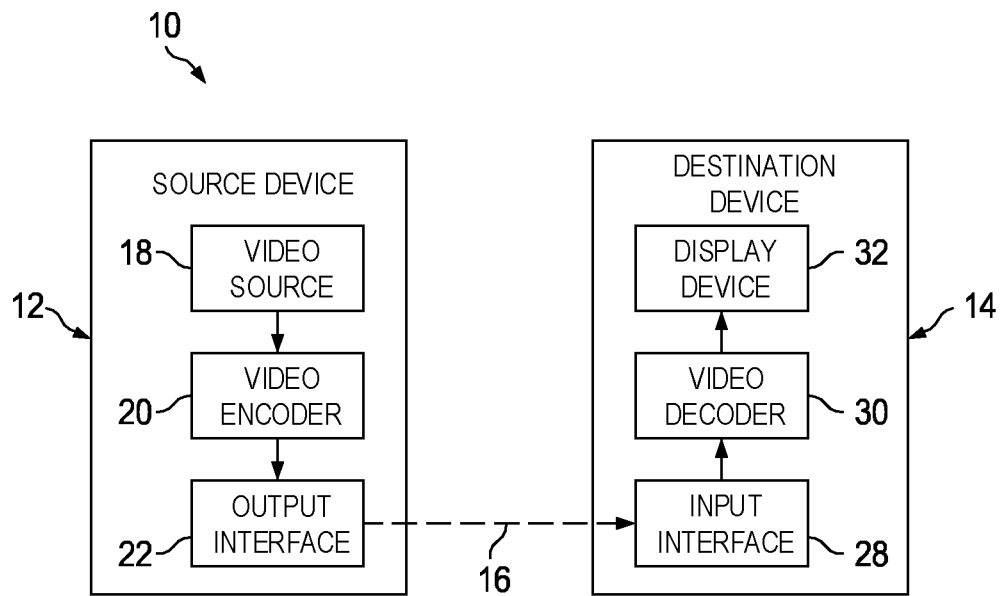
FIG. 1 is a block diagram illustrating an example coding system that may utilize spatial varying transform (SVT) transforms.

FIG. 1 is a block diagram illustrating an example coding system 10 that may utilize video coding techniques such coding using SVT mechanisms. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
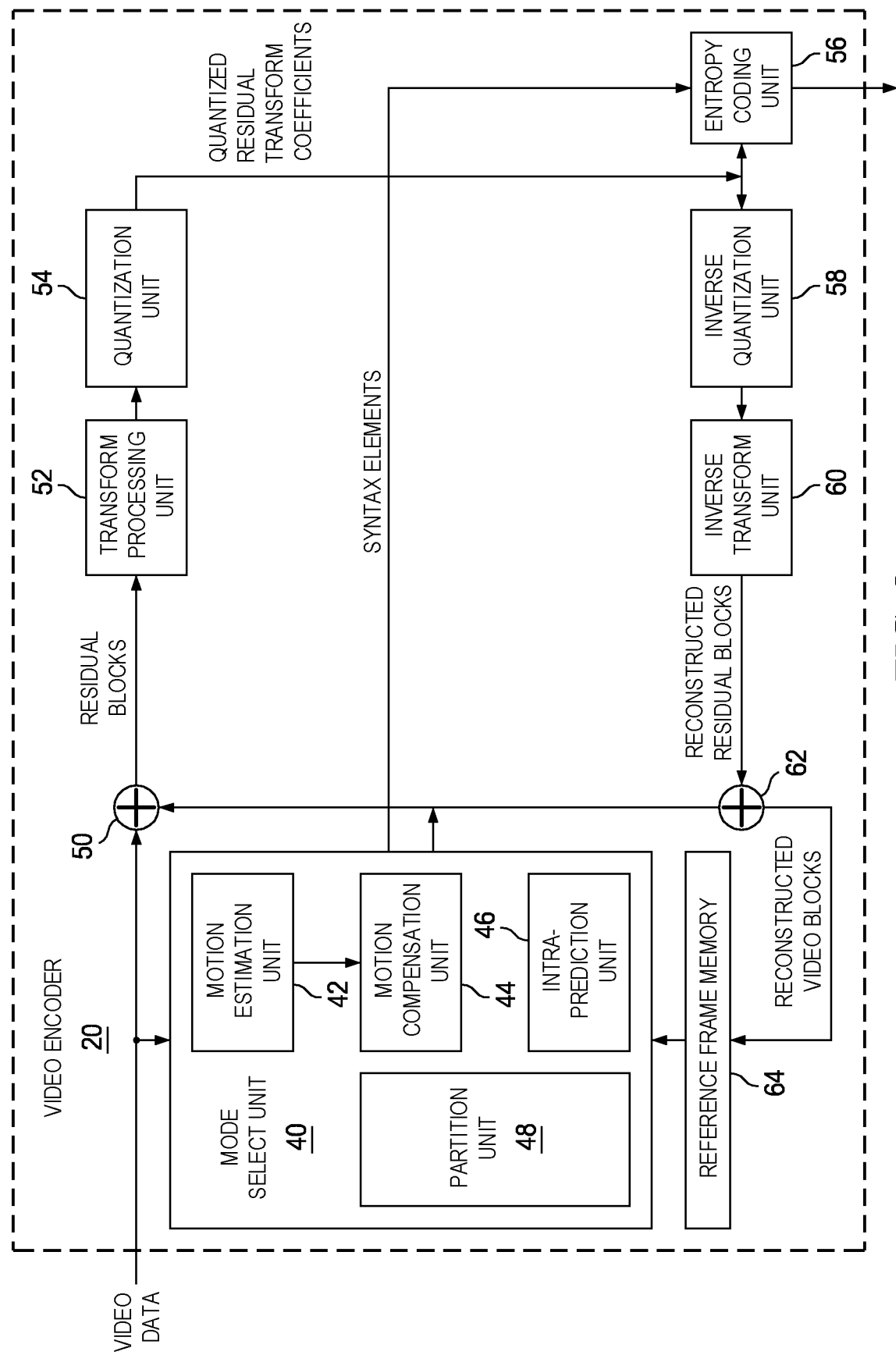
FIG. 2 is a block diagram illustrating an example video encoder that may utilize spatial SVT transforms.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
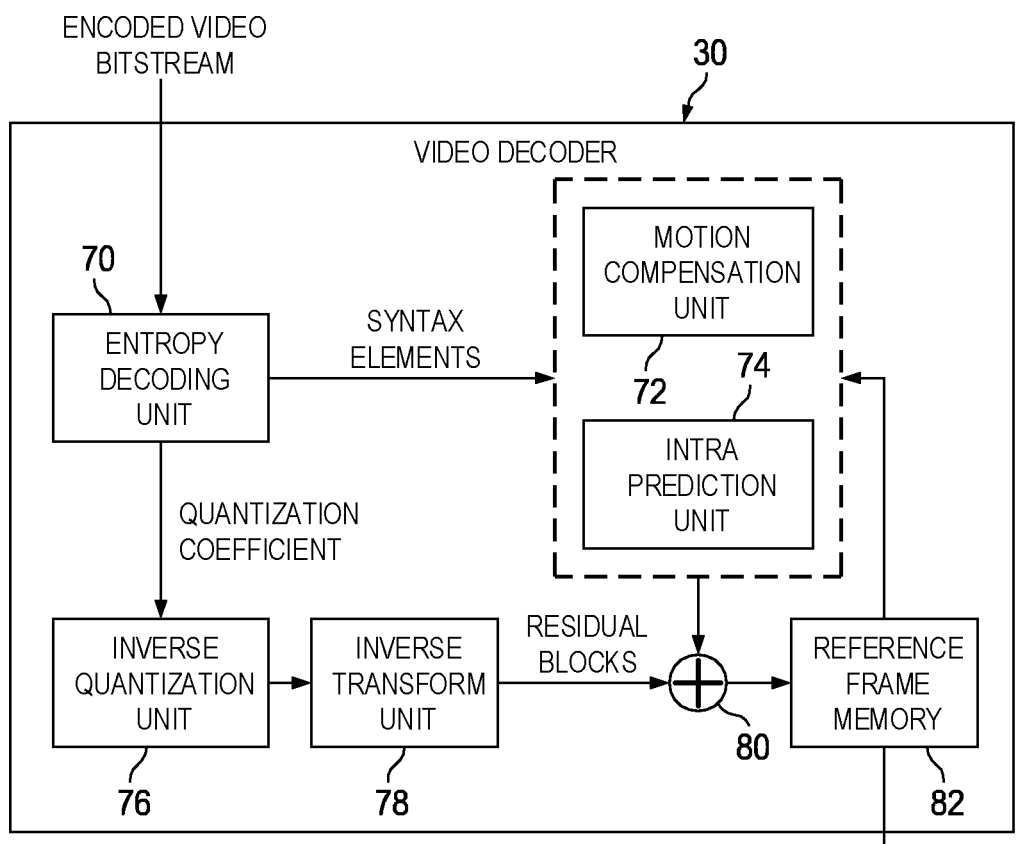
FIG. 3 is a block diagram illustrating an example of a video decoder that may utilize spatial SVT transforms.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Disclosed herein are various mechanisms to increase the coding efficiency of SVT. As noted above, a transform block may be positioned at various candidate positions relative to a corresponding residual block. The disclosed mechanisms employ different transforms for transform blocks based on candidate position. For example, an inverse Discrete Sine Transform (DST) can be applied at candidate positions that cover the bottom-right corner of the residual block. Also, an inverse DCT can be applied at the candidate positions that cover the top-left corner of the residual block. This mechanism can be beneficial because DST is generally more efficient than DCT for transforming residual blocks with more residual information distributed at the bottom-right corner, while DCT is generally more efficient than DST for transforming residual blocks with more residual information distributed at the top left corner. It should also be noted that the bottom-right corner of the residual block statistically contains more residual information for most cases. The disclosed mechanisms also support horizontally reversing residual samples of a transform block in some cases. For example, the residual samples may be horizontally inverted/flipped after an inverse transform block is applied. This may occur when the neighbor block to the right side of the current residual block has already been reconstructed and the neighbor block to the left side of the current residual block has not been reconstructed. This may also occur when inverse DST has been employed as part of the corresponding transport block. This approach provides greater flexibility to encode the information closest to the reconstructed blocks, which results in a reduction of corresponding residual information. The disclosed mechanisms also support context coding of the candidate position information for the transform blocks. Prediction information corresponding to the residual block may be used to code the candidate position information. For example, in some cases a residual block may correspond to a prediction block generated by a template matching mode. Further, a template employed by the template matching mode may be selected based on a spatially neighboring reconstructed area of the residual block. In such a case, the bottom-right portion of the residual block may contain more residual information than other parts of the residual block. Accordingly, the candidate position covering the bottom-right portion of the residual block is most likely to be selected as the best position for the transform. As such, when a residual block is associated with template matching based inter-prediction, only one candidate position may be made available for the residual block, and/or other context coding approaches may be employed for coding of the position information for the transform.

Figure 4:
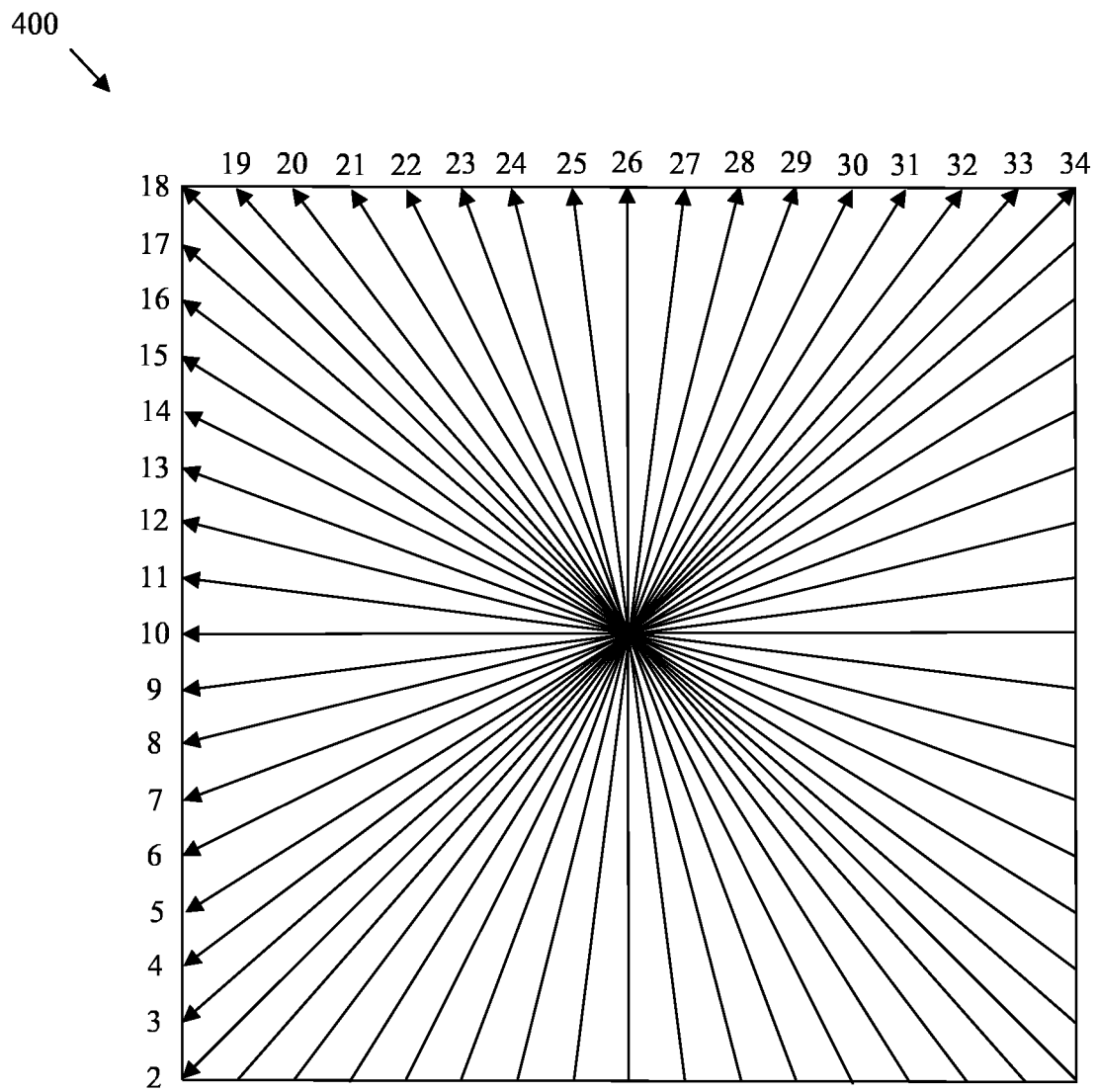
FIG. 4 is a schematic diagram of intra-prediction modes employed in video coding.

FIG. 4 is a schematic diagram of example intra-prediction modes 400 employed in video coding in an HEVC model. Video compression schemes take advantage of data redundancy. For example, most images contain groups of pixels that contain the same or similar color and/or light to adjacent pixels. As a particular example, an image of a night sky may contain large areas of black pixels and clusters of white pixels depicting stars. Intra-prediction modes 400 take advantage of these spatial relations. Specifically, a frame can be broken down into a series of blocks containing samples. Then, rather than transmitting each block, the light/color of blocks can be predicted based on a spatial relationship with reference samples in adjacent blocks. For example, an encoder may denote that a current block contains the same data as a reference sample in a previously encoded block positioned at the top-left corner of the current block. The encoder may then encode a prediction mode instead of a value of the block. This significantly reduces the size of the encoding. As shown by intra-prediction modes 400, the top-left corner corresponds to prediction mode eighteen in HEVC. As such, the encoder can simply store prediction mode eighteen for the block instead of encoding the pixel information for the block. As shown, intra-prediction modes 400 in HEVC include thirty-three angular prediction modes from prediction mode two to prediction mode thirty-four. Intra-prediction modes 400 also include an intra-planar mode 0 and an intra-direct current (DC) mode 1, which predict smooth regions. The intra-planar mode 0 predicts the block as an amplitude surface with vertical and horizontal slopes derived from the neighboring reference samples. The intra-DC mode 1 predicts a block as an average value of the neighboring reference samples. The intra-prediction modes 400 may be employed to signal luma (e.g., light) components of a block. Intra-prediction can also be applied to chroma (e.g., color) values. In HEVC, chroma values are predicted by employing planar mode, angular twenty-six mode (e.g., vertical), angular ten mode (e.g., horizontal), intra-DC and derived mode, where derived mode predicts a correlation between a chroma component and a luma component encoded by intra-prediction modes 400.

The intra-prediction modes 400 for the image blocks are stored by an encoder as prediction information. It should be noted that, while intra-prediction modes 400 are employed for predictions in a single frame, inter-prediction may also be employed. Inter-prediction takes advantage of temporal redundancy across multiple frames. As an example, a scene in a movie may include a relatively static background, such as a desk that doesn't move. Accordingly, the desk is depicted as substantially the same set of pixels across multiple frames. Inter-prediction uses blocks in a first frame to predict blocks in a second frame, which, in this example, prevents the need to encode the desk in each frame. Inter-prediction employs a block matching algorithm to match and compare a block in a current frame with blocks in a reference frame. Motion vectors can then be encoded to indicate the best matched block position in the reference frame and the co-located position of the current/target block. As such, a series of image frames can be represented as a series of blocks, which can then be represented as prediction blocks containing prediction modes and/or motion vectors.

Figure 5:
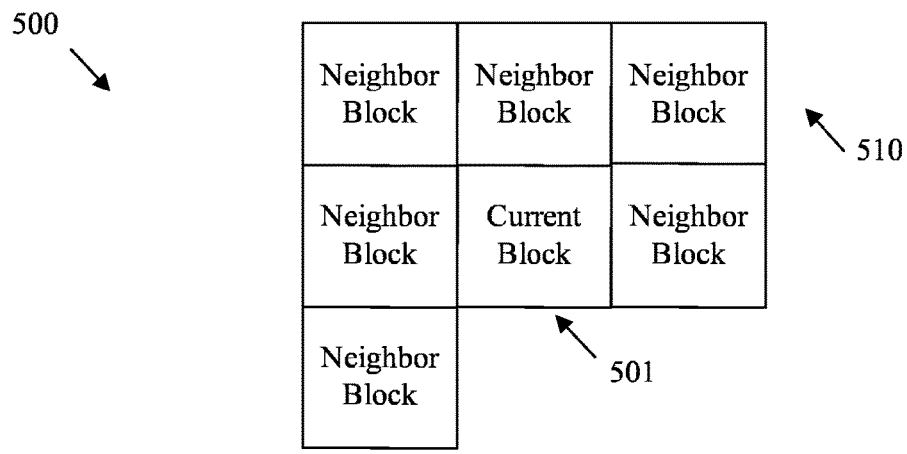
FIG. 5 illustrates an example of intra-prediction in video coding.

FIG. 5 illustrates an example of intra-prediction 500 in video coding that employs intra-prediction modes, such as intra-prediction modes 400. As shown, a current block 501 can be predicted by samples in neighbor blocks 510. Encoders may generally encode an image from top-left to bottom right. However, encoders may encode from right to left in some cases as discussed below. It should be noted that, as used herein right refers to the right side of an encoded image, left refers to the left side of an encoded image, top refers to the top side of an encoded image, and bottom refers to the bottom side of an encoded image.

It should be noted that a current block 501 may not always exactly match a sample from a neighboring block 510. In such a case, a prediction mode is encoded from the closest matching neighboring block 510. In order to allow the decoder to determine the proper value, a difference between the predicted value and the actual value is retained. This is referred to as residual information. Residual information occurs in both intra-prediction 500, as well as inter-prediction.

Figure 6:
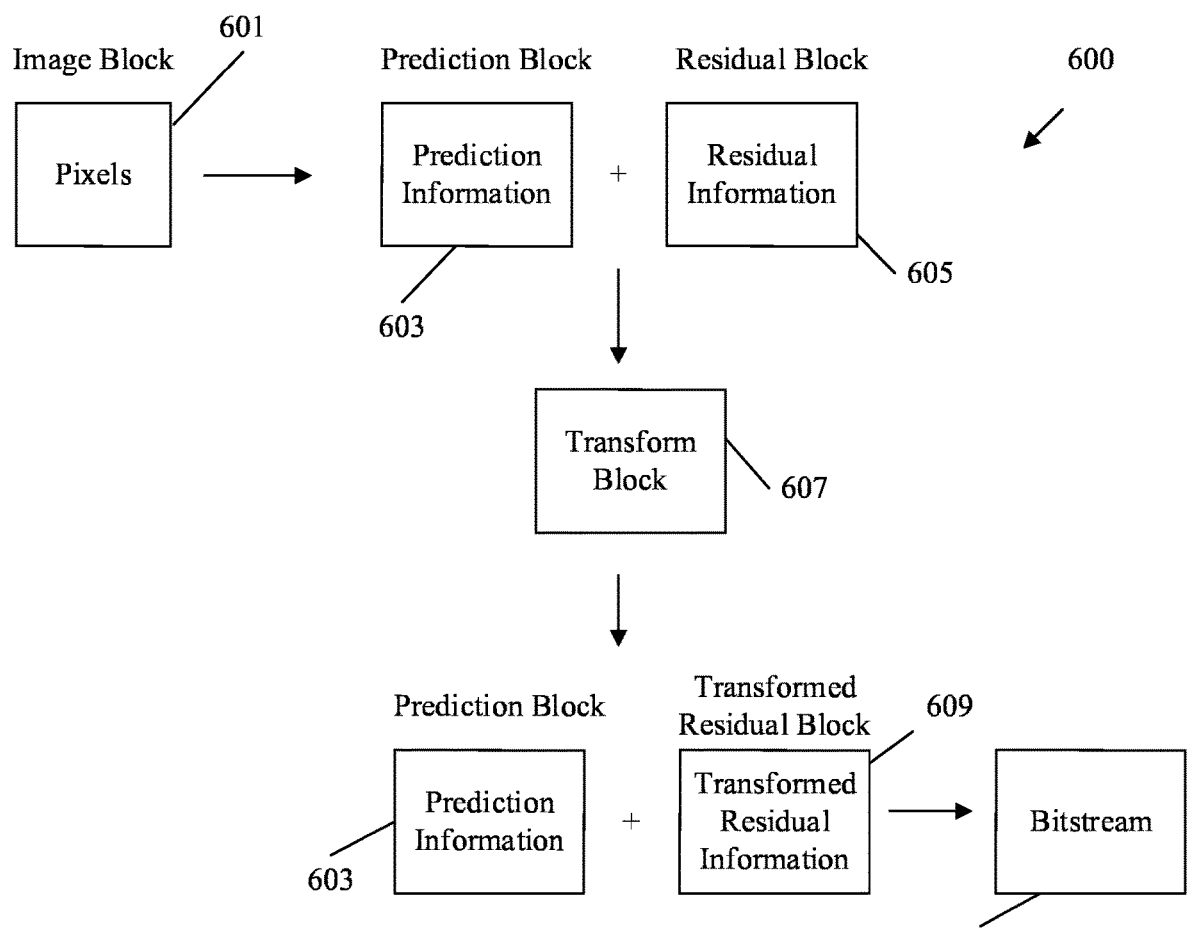
FIG. 6 is a schematic diagram of an example video encoding mechanism.

FIG. 6 is a schematic diagram of an example video encoding mechanism 600, based on intra-prediction 500 and/or inter-prediction. An image block 601 can be obtained by an encoder from one or more frames. For example, an image may be split into a plurality of rectangular image regions. Each region of the image corresponds to a Coding Tree Unit (CTU). A CTU is partitioned into a plurality of blocks, such as the coding units in HEVC. Block partition information is then encoded in a bitstream 611. Accordingly, the image block 601 is a partitioned portion of an image and contains pixels that represent luma components and/or chroma components at a corresponding portion of the image. During encoding, the image block 601 is encoded as a prediction block 603 containing prediction information such as prediction modes (e.g., intra-prediction modes 400) for intra-prediction and/or motion vectors for inter-prediction. Encoding the image block 601 as a prediction block 603 may then leave a residual block 605 containing residual information indicating the difference between the prediction block 603 and the image block 601.

It should be noted that an image block 601 may be partitioned as a coding unit that contains one prediction block 603 and one residual block 605. The prediction block 603 may contain all prediction samples of the coding unit, and the residual block 605 may contain all residual samples of the coding unit. In such a case, the prediction block 603 is of the same size as the residual block 605. In another example, the image block 601 may be partitioned as a coding unit that contains two prediction blocks 603 and one residual block 605. In such a case, each prediction block 603 contains a portion of the prediction samples of the coding unit, and the residual block 605 contains all of the residual samples of the coding unit. In yet another example, the image block 601 is partitioned into a coding unit that contains two prediction blocks 603 and four residual blocks 605. The partition pattern of the residual blocks 605 in a coding unit may be signaled in the bitstream 611. Such position patterns may include Residual Quad-Trec (RQT) in HEVC. Further, an image block 601 may contain only luma components (e.g., light), denoted as Y components, of image samples (or pixels). In other cases, the image block 601 may contain Y, U and V components of image samples, where U and V indicate chrominance components (e.g., color) in a blue luminance and red luminance (UV) colorspace.

SVT may be employed to further compress the information. Specifically, SVT employs a transform block 607 to further compress the residual block 605. The transform block 607 contains a transform, such as inverse DCT and/or inverse DST. The difference between the prediction block 603 and the image block 601 is the fit to the transform by employing transform coefficients. By indicating the transform mode of the transform block 607 (e.g., inverse DCT and/or inverse DST) and the corresponding transform coefficients, the decoder can reconstruct the residual block 605. When exact reproduction is not required, the transform coefficients can be further compressed by rounding certain values to create a better fit for the transform. This process is known as quantization and is performed according to quantization parameters that describe the allowable quantization. Accordingly, the transform modes, transform coefficients, and quantization parameters of the transform block 607 are stored as transformed residual information in a transformed residual block 609, which may also be referred to simply as a residual block in some cases.

The prediction information of the prediction block 603 and the transformed residual information of the transformed residual block 609 can then be encoded in a bitstream 611. The bitstream 611 can be stored and/or transmitted to a decoder. The decoder can then perform the process in reverse to recover the image block 601. Specifically, the decoder can employ the transformed residual information to determine the transform block 607. The transform block 607 can then be employed in conjunction with the transformed residual block 609 to determine the residual block 605. The residual block 605 and the prediction block 603 can then be employed to reconstruct the image block 601. The image block 601 can then be positioned relative to other decoded image blocks 601 to reconstruct frames and position such frames to recover the encoded video.

SVT is now described in further detail. To conduct SVT, the transform block 607 is selected to be smaller than the residual block 605. The transform block 607 is employed to transform a corresponding part of the residual block 605, and leave the remainder of the residual block 605 without additional coding/compression. This is because the residual information is generally not evenly distributed across the residual block 605. SVT employs a smaller transform block 607 with an adaptive position to capture the majority of the residual information in the residual block 605, without requiring the entire residual block 605 to be transformed. This approach may achieve better coding efficiency than transforming all the residual information in the residual block 605. As the transform block 607 is smaller than the residual block 605, SVT employs a mechanism for signaling the position of the transform relative to the residual block 605. For example, when SVT is applied for a residual block 605 of size w×h (e.g., width times height), the size and position information of the transform block 607 may be coded into the bitstream 611. This allows the decoder to reconstruct the transform block 607 and compose the transform block 607 into the correct position relative to the transformed residual block 609 for reconstruction of the residual block 605.

It should be noted that some prediction blocks 603 can be encoded without resulting in a residual block 605. However, such a case does not result in the use of SVT and hence is not discussed further. As noted above, SVT may be employed for inter-predicted blocks or intra-predicted blocks. Further, SVT may be employed on residual blocks 605 generated by specified inter-prediction mechanisms (e.g., translation model based motion compensation), but may not be employed to residual blocks 605 generated by other specified inter-prediction mechanisms (e.g., affine model based motion compensation).

Figure 7:
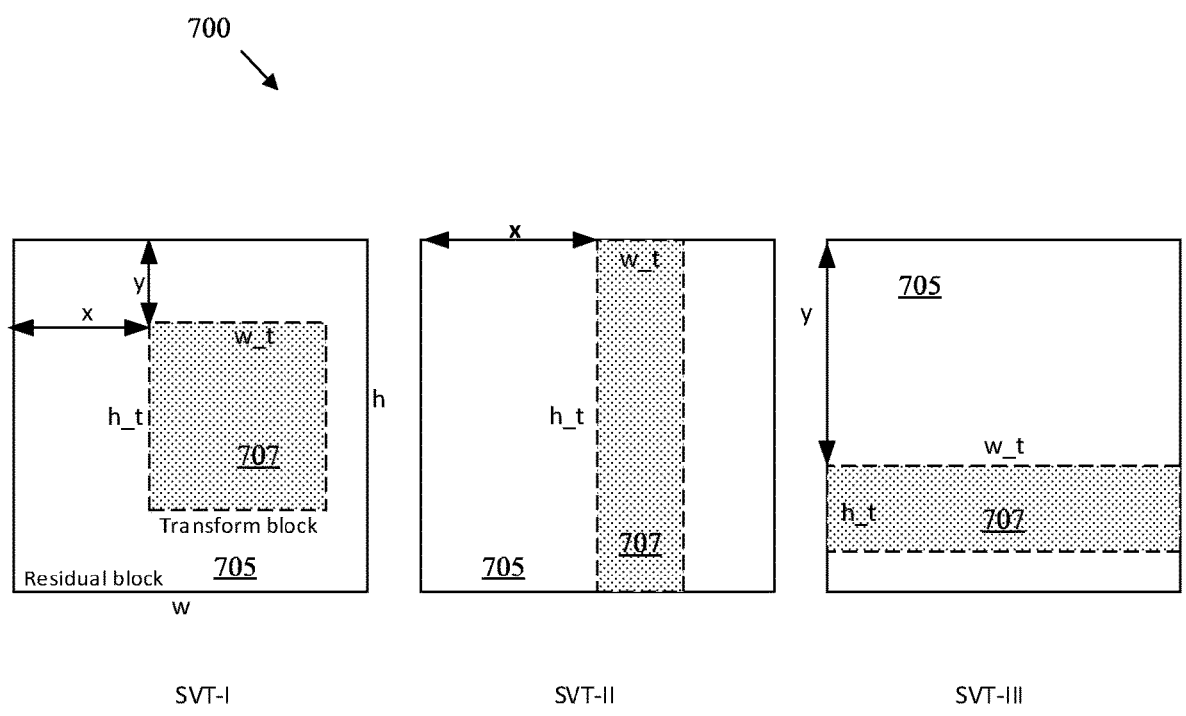
FIG. 7 illustrates example SVT transforms.

FIG. 7 illustrates SVT examples 700 containing a transform block 707 and a residual block 705. The transform block 707 and the residual block 705 of FIG. 7 are similar to the transform block 607 and the residual block 605 of FIG. 6, respectively. For case of reference, the SVT examples 700 are referred to as SVT-I, SVT-II, and SVT-III.

SVT-I is described as $w\_t=w/2$, $h\_t=h/2$, where $w\_t$ and $h\_t$ denote the width and height of the transform block 707, respectively, and w and h denote the width and height of the residual block 705, respectively. For example, the width and height of the transform block 707 are both half of the width and height of the residual block 705. SVT-II is described as $w\_t=w/4$, $h\_t=h$ where the variables are as described above. For example, the transform block 707 width is a quarter of the width of the residual block 705 and the height of the transform block 707 is equal to the height of the residual block 705. SVT-III is described as $w\_t=w$, $h\_t=h/4$ where the variables are as described above. For example, the width of the transform block 707 is equal to the width of the residual block 705 and the height of the transform block 707 is one quarter of to the height of the residual block 705. The type information indicating the type of SVT (e.g., SVT-I, SVT-II, or SVT-III) is coded into bitstream to support reconstruction by the decoder.

As can be seen by FIG. 7, each transform block 707 can be positioned in various locations relative to the residual block 705. The position of the transform block 707 is represented by a position offset (x, y) to the top-left corner of the residual block 705, where x indicates the horizontal distance between the top-left corner of the transform block 707 and that of the residual block 705 in the unit of pixels, and y indicates the vertical distance between the top-left corner of the transform block 707 and that of the residual block 705 in the unit of pixels. Each potential position of the transform block 707 inside the residual block 705 is referred to as a candidate position. For a residual block 705, the number of candidate positions is $(w-w\_t+1)\times(h-h\_t+1)$ for a type of SVT. More specifically, for a 16×16 residual block 705, when SVT-I is used, there are eighty-one candidate positions. When SVT-II or SVT-III is used, there are thirteen candidate positions. Once determined, the x and y values of the position offset are coded into bitstream along with the type of SVT block employed. To reduce complexity for SVT-I, a subset of thirty-two positions can be selected from the eighty-one possible candidate positions. This subset then acts as the allowed candidate positions for SVT-I.

One drawback of an SVT scheme employing one of the SVT examples 700 is that encoding the SVT position information as residual information results in significant signaling overhead. In addition, the encoder complexity may be significantly increased as the number of positions tested by compression quality processes, such as Rate-Distortion Optimization (RDO), increases. Because the number of candidate positions increases with the size of the residual block 705, the signaling overhead can be even bigger for larger residual blocks 705, such as 32×32 or 64×128. Another drawback of employing one of the SVT examples 700 is that the size of the transform block 707 is one quarter of the size of the residual block 705. A transform block 707 of such a size may not be large enough to cover the major residual information in the residual block 705 in many cases.

Figure 8:
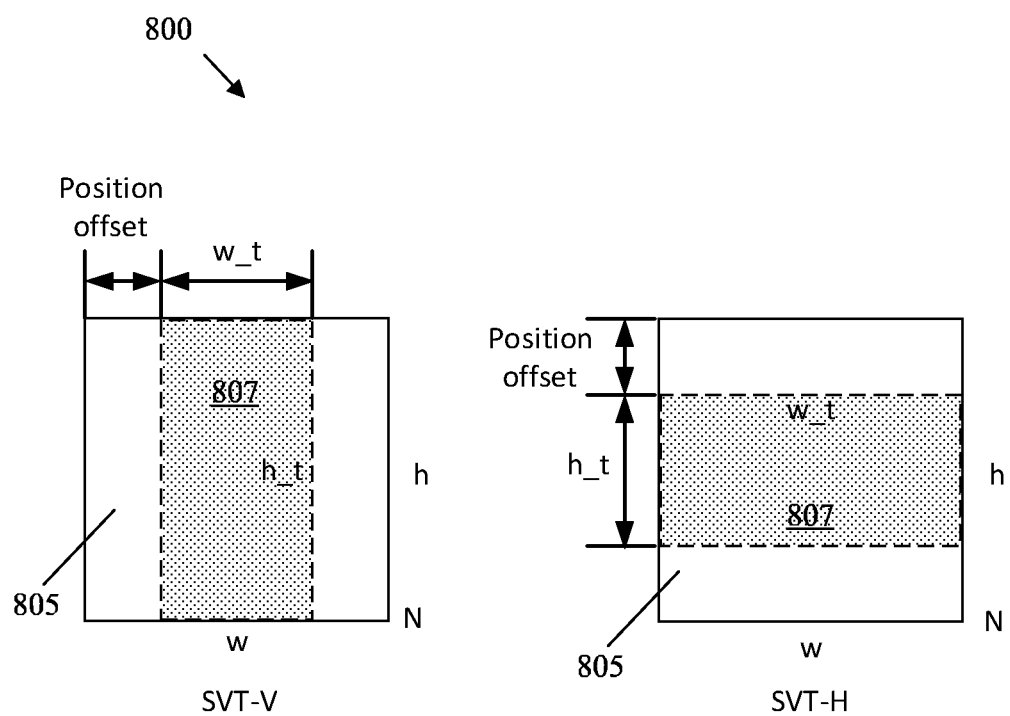
FIG. 8 illustrates example SVT transforms.

FIG. 8 illustrates additional SVT examples 800 containing a transform block 807 and a residual block 805. The transform block 807 and the residual block 805 of FIG. 8 are similar to the transform block 607, 707 and the residual block 605, 705 of FIGS. 6-7, respectively. For case of reference, the SVT examples 800 are referred to as SVT vertical (SVT-V) and SVT horizontal (SVT-H). The SVT examples 800 are similar to the SVT examples 700, but are designed to support reduced signaling overhead and less complex processing requirements on the encoder.

SVT-V is described as $w\_t=w/2$ and $h\_t=h$, where the variables are as described above. The width of the transform block 807 is half of the width of the residual block 805 and the height transform block 807 is equal to the height of the residual block 805. SVT-H is described as $w\_t=w$ and $h\_t=h/2$, where the variables are as described above. For example, the width of the transform block 807 is equal to the width of the residual block 805 and the height transform block 807 is half of the height of the residual block 805. SVT-V is similar to SVT-II and SVT-H is similar to SVT-III. Compared with SVT-II and SVT-III, the transform block 807 in SVT-V and SVT-H is enlarged to half of the residual block 805 so that the transform block 807 covers more residual information in the residual block 805.

As with the SVT examples 700, the SVT examples 800 can include several candidate positions, where candidate positions are the possible allowable positions of a transform block (e.g., transform block 807) relative to a residual block (e.g., residual block 805). Candidate positions are determined according to a Candidate Position Step Size (CPSS). Candidate positions may be separated with an equal space specified by the CPSS. In such a case, the number of candidate positions is reduced to no more than five. The reduced number of candidate positions mitigates the signaling overhead associated with the position information as the selected position for a transform can be signaled with fewer bits. Further, reducing the number of candidate positions makes the selection of a transform position algorithmically simpler, which allows the encoder complexity to be reduced (e.g., resulting in fewer computing resources employed to encode).

Figure 9:
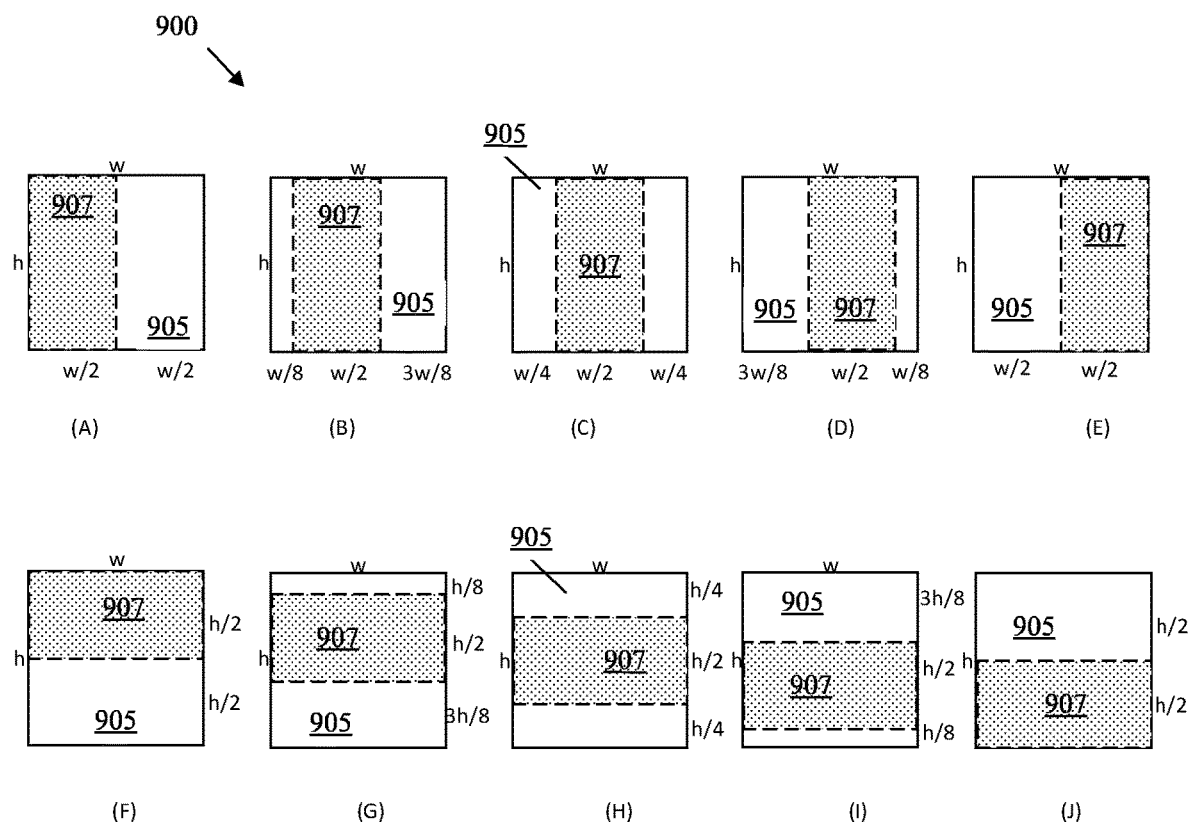
FIG. 9 illustrates example SVT transform candidate positions relative to a residual block.

FIG. 9 illustrates SVT examples 900 containing a transform block 907 and a residual block 905. The transform block 907 and the residual block 905 of FIG. 9 are similar to the transform block 607, 707, 807 and the residual block 605, 705, 805 of FIGS. 6-8, respectively. FIG. 9 illustrates various candidate positions, where candidate positions are the possible allowable positions of a transform block (e.g., transform block 907) relative to a residual block (e.g., residual block 905). Specifically, the SVT examples in FIGS. 9A-9E employ SVT-V and the SVT examples in FIGS. 9F-9J employ SVT-H. The allowable candidate positions for a transform depend on the CPSS, which further depends on the portion of the residual block 905 that the transform block 907 should cover and/or a step size between candidate positions. For example, the CPSS may be calculated as s=w/M1 for SVT-V or s=h/M2 for SVT-H, where w and h are the width and height of the residual block, respectively, and M1 and M2 are pre-determined integers in range of two to eight. More candidate positions are allowed with a larger M1 or M2 value. For example, M1 and M2 may both be set as eight. In this case, a value of the position index (P) describing the location of the transform block 907 relative to the residual block 905 is between zero and four.

In another example, the CPSS is calculated as s=max(w/M1, Th1) for SVT-V or s=max(h/M2, Th2) for SVT-H, where Th1 and Th2 are pre-defined integers specifying a minimum step size. Th1 and Th2 may be integers that are no less than two. In this example, Th1 and Th2 are set as four, M1 and M2 are set as eight, and different block sizes may have a different number of candidate positions. For example, when the width of the residual block 905 is eight, two candidate positions are available for SVT-V, specifically candidate positions in FIGS. 9A and 9E. For example, only two candidate positions satisfy the CPSS when the step size, as indicated by Th1, is large and the portion of the residual block 905 that the transform block 907 covers, as indicated by w/M1, is also large. However, when w is set to sixteen, the portion of the residual block 905 that the transform block 907 covers decreases due to a change in w/M1. This results in more candidate positions, in this case the three candidate positions as shown in FIGS. 9A, 9C, and 9E. All five candidate positions illustrated in FIGS. 9A-9E are available when the width of the residual block 905 is greater than sixteen while the values of Th1 and M1 are as discussed above.

Other examples can also be seen when CPSS is calculated according to other mechanisms. Specifically, the CPSS may be calculated as s=w/M1 for SVT-V or s=h/M2 for SVT-H. In this case, three candidate positions are allowed for SVT-V (e.g., the candidate positions in FIGS. 9A, 9C, and 9E) and three candidate positions are allowed for SVT-H (e.g., the candidate positions in FIGS. 9F, 9H, and 9J) when M1 and M2 are set as four. Further, when M1 and M2 are set as four, the portion of the residual block 905 that the transform block 907 covers increases resulting in two allowable candidate positions of SVT-V (e.g., the candidate positions in FIGS. 9A and 9E) and two allowable candidate positions for SVT-H (e.g., the candidate positions in FIGS. 9F and 9J).

In another example, the CPSS is calculated as s=max(w/M1, Th1) for SVT-V or s=max(h/M2, Th2) for SVT-H as discussed above. In this case, T1 and T2 are set as a pre-defined integer, for example two, M1 is set as eight if w≥h or is set as four when w<h, and M2 is set as eight when h≥w or is set as four when h<w. For example, the portion of the residual block 905 that the transform block 907 covers is dependent on whether the height of the residual block 905 is greater than the width of the residual block 905, or vice versa. Accordingly, the number of candidate positions for SVT-H or SVT-V further depends on the aspect ratio of the residual block 905.

In another example, the CPSS is calculated as s=max(w/M1, Th1) for SVT-V or s=max(h/M2, Th2) for SVT-H, as discussed above. In this case, the values of M1, M2, Th1, and Th2 are derived from a high-level syntax structure in the bitstream (e.g., a sequence parameter set). For example, the values employed to derive CPSS can be signaled in the bitstream. M1 and M2 may share the same value parsed from a syntax element, and Th1 and Th2 may share the same value parsed from another syntax element.

Figure 10:
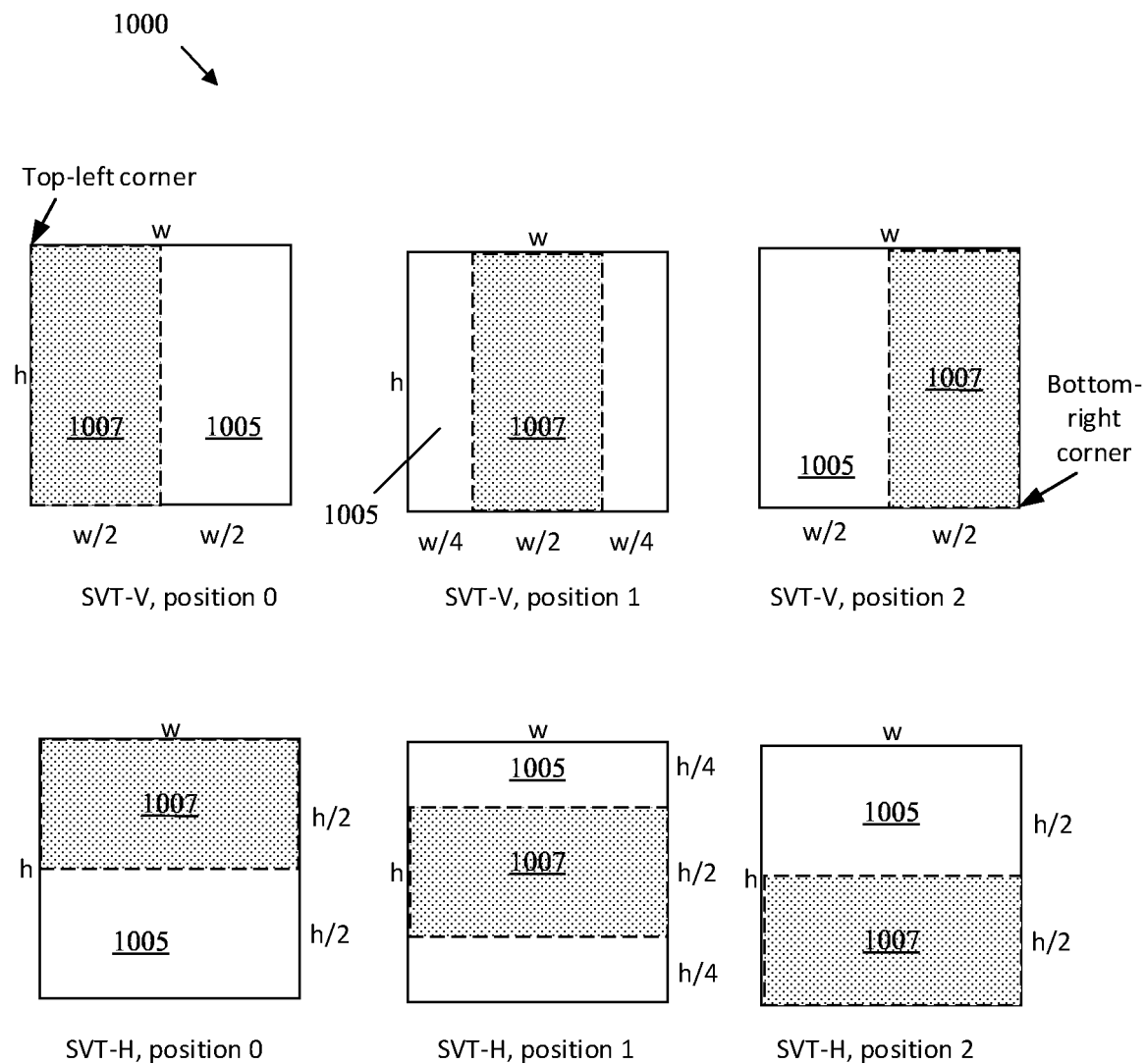
FIG. 10 illustrates example SVT transform positions relative to a residual block.

FIG. 10 illustrates example SVT positions 1000 that depict a position of a transform block 1007 relative to a residual block 1005. While six different positions are illustrated (e.g., three vertical positions and three horizontal positions), it should be appreciated that a different number of positions may be used in practical applications. The SVT transform positions 1000 are selected from the candidate positions in the SVT examples 900 of FIG. 9. Specifically, the SVT transform positions 1000 selected may be encoded to a position index (P). The position index P can be employed to determine a position offset (Z) of the top-left corner of the transform block relative to the top-left corner of the residual block. For example, this position correlation can be determined according to Z=s×P, where s is a CPSS for the transform block based on SVT type and calculated as discussed with respect to FIG. 9. The value of P may be encoded as $$0, 1, \ldots, \frac{w - w\_t}{s}$$

when the transform block is an SVT-V type. The value of P may be encoded as $$0, 1, \ldots, \frac{h - h\_t}{s}$$

when the transform block is a SVT-H type. More specifically, (0, 0) can represent the coordinate of the top-left corner of the residual block. In such a case, the coordinate of the top-left corner of the transform block is (Z, 0) for SVT-V or (0, Z) for SVT-H.

As discussed in further detail below, the encoder may encode the SVT transform type (e.g., SVT-H or SVT-T) and the residual block size in the bitstream by employing flags. The decoder may then determine the SVT transform size based on the SVT transform size and residual block size. Once the SVT transform size is determined, the decoder can determine the allowable candidate positions of the SVT transform, such as the candidate positions in the SVT examples 900 of FIG. 9, according to the CPSS function. As the decoder is capable of determining the candidate positions of the SVT transform, the encoder may not signal the coordinates of the position offset. Instead, a code can be employed to indicate which of the candidate positions is employed for the corresponding transform. For example, the position index P may be binarized into one or more bins using truncated unary code for increased compression. As a particular example, when the P value is in the range of zero to four, the P value 0, 4, 2, 3 and 1 can be binarized as 0, 01, 001, 0001 and 0000, respectively. This binary code is more compressed than expressing the base ten value of the position index. As another example, when the P value is in the range of zero to one, the P value 0 and 1 can be binarized as 0 and 1, respectively. As such, the position index can grow or shrink in size as desired to signal a particular transform block position in light of the possible candidate positions for the transform block.

The position index P may be binarized into one or more bins by employing a most probable position and less probably remaining positions. For example, when the left and top neighbor blocks have already been decoded at the decoder, and hence are available for prediction, the most probable position may be set as the position covering the bottom-right corner of the residual block. In one example, when the P value is in the range of zero to four and position four is set as the most probable position, P value 4, 0, 1, 2 and 3 are binarized as 1, 000, 001, 010 and 011, respectively. Further, when the P value is in the range of zero to two and position two is set as the most probable position, P value 2, 0 and 1 are binarized as 1, 01 and 00, respectively. Accordingly, the most probable position index of the candidate positions is denoted with the fewest bits to reduce signaling overhead for the most common cases. The probability can be determined based on the coding order of adjacent reconstructed blocks. Accordingly, the decoder can infer the code word scheme to be employed for a corresponding block based on the decoding scheme employed.

For example, in HEVC the coding unit coding order is generally from top to bottom and from left to right. In such case, the right-side of a current encoding/decoding coding unit is not available rendering the top-right corner the more probable transform position. However, motion vector predictors are derived from the left and top spatial neighbors. In such a case, the residual information is statistically more intense towards the bottom-right corner. In this case, the candidate position covering the bottom-right part is the most probable position. Further, when an adaptive coding unit coding order is utilized, one node may split vertically into two child nodes and the right child node may be coded before the left one. In this case, the right-side neighbor of the left child node has been reconstructed before the decoding/encoding of the left child node. Further, in such a case, the left-side neighboring pixels are not available. When the right-side neighbor is available and the left-side neighbor is not available, the bottom-left portion of the residual block is likely to contain a large amount of residual information, and thus the candidate position covering the bottom-left portion of the residual block becomes the most probable position.

Therefore, the position index P may be binarized into one or more bins according to whether the right side next to the residual block has been reconstructed. In one example, the P value is in the range of zero to 2, as shown by SVT transform positions 1000. When the right side next to the residual block has been reconstructed, the P value 0, 2 and 1 are binarized as 0, 01 and 00. Otherwise, the P value 2, 0 and 1 are binarized as 0, 01 and 00. In another example, when the right side next to the residual block has been reconstructed, but the left side next to the residual block has not been reconstructed, the P value 0, 2 and 1 are binarized as 0, 00 and 01. Otherwise, the P value 2, 0 and 1 are binarized as 0, 00 and 01. In these examples, the position corresponding to a single bin is the most probable position and the other two positions are remaining positions. For example, the most probable position is dependent on the availability of the right-side neighbor.

The probability distribution of the best position in the sense of rate-distortion performance may be quite different across inter-prediction modes. For example, when the residual block corresponds to a prediction block generated by template matching with spatially neighboring reconstructed pixels as the template, the best position is most probably position two. For other inter-prediction modes, the probability of position two (or position zero when the right neighbor is available and the left neighbor is not available) being the best position is lower than that of the template matching mode. In view of this, the context model for the first bin of position index P may be decided according to the inter-prediction mode associated with the residual block. More specifically, when the residual block is associated with template matching based inter-prediction, the first bin of position index P uses a first context model. Otherwise, a second context model is used for encoding/decoding this bin.

In another example, when the residual block is associated with template matching based inter-prediction, the most probable position (e.g., position two, or position zero when the right neighbor is available but the left neighbor is not available) is directly set as the transform block position and position information is not signaled in the bitstream. Otherwise, the position index is explicitly signaled in the bitstream.

It should also be noted that different transforms can be employed depending on the position of the transform block relative to the residual block. For example, the left side of the residual block is reconstructed and the right side of the residual block is not reconstructed, which occurs for video coding with a fixed coding unit coding order from left to right and from top to bottom (e.g., the coding order in HEVC). In this case, the candidate position covering the bottom-right corner of the residual block may employ DST (e.g., DST version seven (DST-7) or DST version one (DST-1)) for a transform in a transform block when encoding. Accordingly, an inverse DST transform is employed at the decoder for the corresponding candidate position. Further, a candidate position covering the top-left corner of the residual block may employ DCT (e.g., DCT version eight (DCT-8) or DCT version two (DCT-2)) for a transform in the transform block when encoding. Accordingly, an inverse DCT transform is employed at the decoder for the corresponding candidate position. This is because the bottom-right corner is the most distant to the spatially reconstructed area among the four corners in this case. Further, DST is more effective than DCT for transforming the residual information distribution when the transform block covers the bottom-right corner of the residual block. However, DCT is more effective than DST for transforming the residual information distribution when the transform block covers the top-left corner of the residual block. For the rest of the candidate positions, the transform type can be either inverse DST or DCT. For example, when a candidate position is closer to the bottom-right corner than the top-left corner, inverse DST is employed as the transform type. Otherwise inverse DCT is employed the transform type.

As a specific example, three candidate positions for the transform block 1007 may be allowed as shown in FIG. 10. In this case, position zero covers the top-left corner and position two covers the bottom-right corner. Position one is at the middle of the residual block 1005 and equidistant to both left and right corners. The transform types can be selected as DCT-8, DST-7 and DST-7 for position zero, position one, and position two, respectively, at the encoder. Inverse transforms DCT-8, DST-7 and DST-7 can then be employed at the decoder for position zero, position one, and position two, respectively. In another example, the transform types for position zero, position one, and position two are DCT-2, DCT-2 and DST-7, respectively, at the encoder. Inverse transforms DCT-2, DCT-2 and DST-7 can then be employed at the decoder for position zero, position one, and position two, respectively. As such, the transform types for corresponding candidate positions can be predetermined.

In some cases, the position-dependent multiple transforms described above may be applied to luma transform blocks only. The corresponding chroma transform blocks may always use inverse DCT-2 in the transform/inverse transform process.

Figure 11:
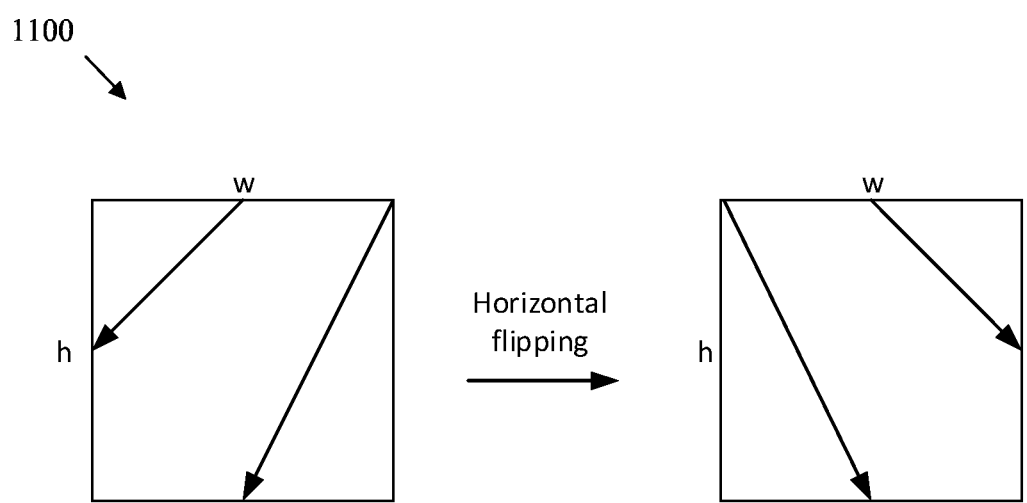
FIG. 11 illustrates an example of residual sample horizontal flipping.

FIG. 11 illustrates an example 1100 of residual sample horizontal flipping. In some cases, beneficial residual compression can be achieved by horizontally flipping the residual information in the residual block (e.g., residual block 605) before applying a transform block (e.g., transform block 607) at the encoder. Example 1100 illustrates such horizontal flipping. In this context, horizontal flipping refers to rotating the residual samples in a residual block about an axis half way between the left side of the residual block and the right side of the residual block. Such horizontal flipping occurs prior to applying the transform (e.g., the transform block) at the encoder and after applying the inverse transform (e.g., the transform block) at the decoder. Such flipping may be employed when specified pre-defined conditions occur.

In one example, the horizontal flipping occurs when the transform block employs DST/inverse DST in the transform process. In this case, the right-side neighbor of the residual block is encoded/reconstructed prior to the current block, and the left-side neighbor is not encoded/reconstructed prior to the current block. The horizontal flipping process exchanges the residual samples at column i of the residual block with the residual samples at column w-1-i of the residual block. In this context, w is the width of the transform block and i=0, 1, . . . , (w/2)-1. The horizontal flipping of the residual samples may increase coding efficiency by making the residual distribution fit better to a DST transform.

Figure 12:
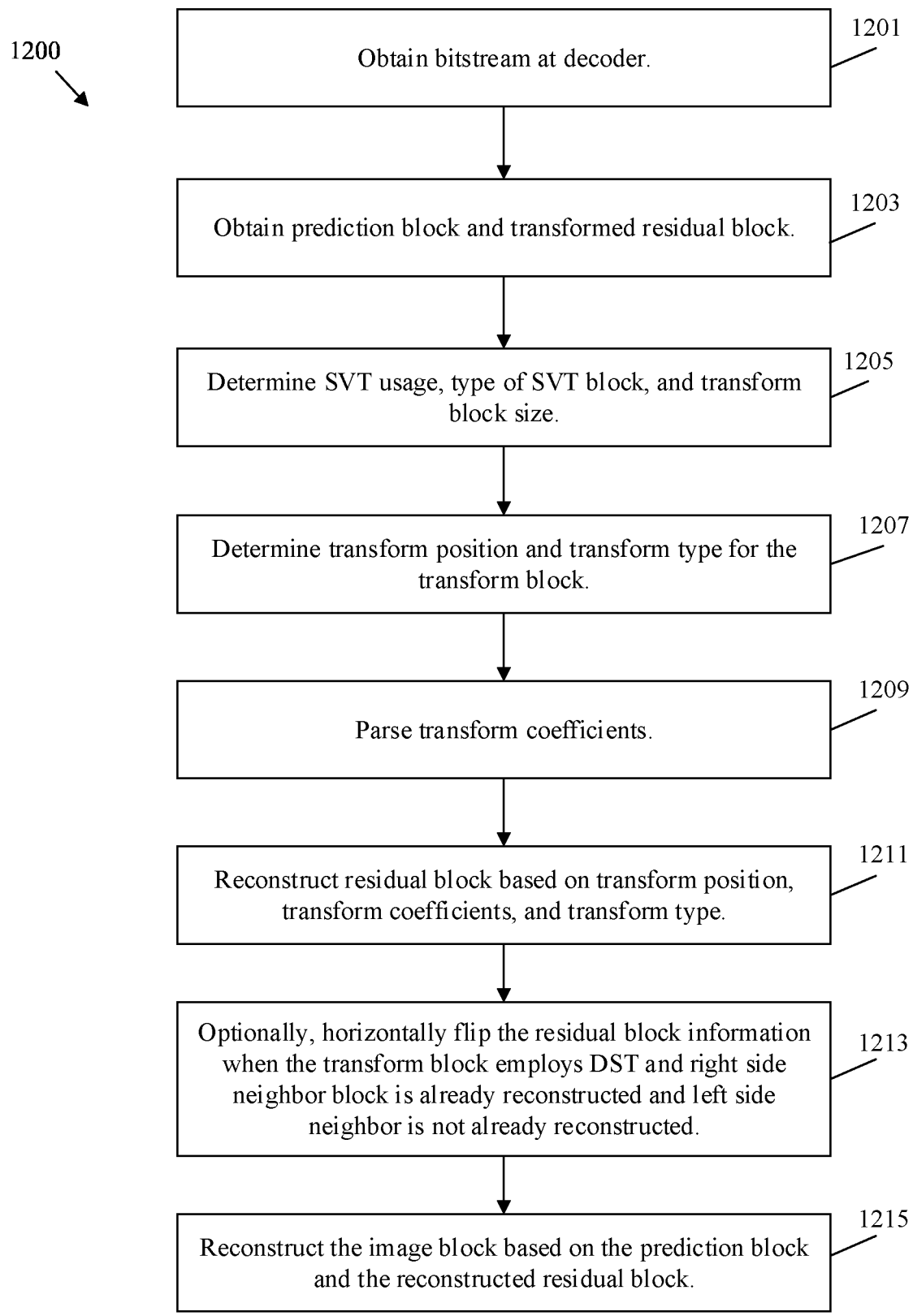
FIG. 12 is a flowchart of an example method of video decoding with position dependent SVT.

FIG. 12 is a flowchart of an example method 1200 of video decoding with position dependent SVT that employs the mechanisms discussed above. Method 1200 may be initiated at a decoder upon receiving a bitstream, such as bitstream 611. The method 1200 employs the bitstream to determine prediction blocks and transformed residual blocks, such as prediction block 603 and transformed residual block 609. The method 1200 also determines transform blocks, such as transform block 607, which is employed to determine residual blocks, such as residual block 605. The residual blocks 605 and the prediction blocks 603 are then employed to reconstruct image blocks, such as image block 601. It should be noted that while method 1200 is described from the perspective of the decoder, a similar method may be employed (e.g., in reverse) to encode the video by employing SVT.

At block 1201, a bitstream is obtained at the decoder. The bitstream may be received from memory or from a streaming source. The bitstream contains data which can be decoded into at least one image corresponding to video data from an encoder. Specifically, the bitstream contains block partition information that can be employed to determine a coding unit containing prediction blocks and residual blocks from the bitstream as described in mechanism 600. As such, coding information related to the coding units can be parsed from the bitstream and pixels of the coding units can be reconstructed based on the coding information as discussed below.

At block 1203, a prediction block and a corresponding transformed residual block are obtained from the bitstream based on the block partition information. For this example, the transformed residual block has been encoded according to SVT as discussed with respect to mechanism 600 above.

The method 1200 then reconstructs a residual block of size w×h from the transformed residual block as discussed below.

At block 1205, the SVT usage, type of SVT, and transform block size are determined. For example, the decoder first determines whether SVT has been used in the encoding. This is because some encodings employ transforms that are the size of the residual block. The usage of SVT can be signaled by a syntax element in the bitstream. Specifically, when a residual block is allowed to employ SVT, a flag, such as svt_flag, is parsed from the bitstream. The residual block is allowed to employ SVT when the transformed residual block has non-zero transform coefficients (e.g., corresponding to any luma or chroma components). For example, a residual block may employ SVT when the residual block contains any residual data. The SVT flag indicates whether the residual block is coded using a transform block of the same size to the residual block (e.g., svt_flag is set to zero) or the residual block is coded with a transform block of a smaller size than the residual block (e.g., svt_flag is set to one). A coded block flag (cbf) can be employed to indicate whether a residual block includes non-zero transform coefficients of a color component, as used in HEVC. Also, a root coded block (root cbf) flag can indicate whether a residual block contains non-zero transform coefficients of any color component, as used in HEVC. As a particular example, a residual block is allowed to use SVT when the image block is predicted using inter-prediction and either the residual block width or residual block height falls in a pre-determined range of [a1, a2], where a1=16 and a2=64, a1=8 and a2=64, or a1=16 and a2=128. The values of a1 and a2 can be predetermined fixed values. The values may also be derived from a sequence parameter set (SPS) or a slice header in the bitstream. When the residual block does not employ SVT, the transform block size is set as the width and height of the residual block size. Otherwise, the transform size is determined based on the SVT transform type.

Once the decoder determines that SVT has been used for the residual block, the decoder determines the type of SVT transform block used and derives the transform block size according to the SVT type. Allowed SVT types for the residual block are decided based on the width and height of the residual block. An SVT-V transform as shown in FIG. 8 is allowed if the width of the residual block is in the range [a1, a2] as such values are defined above. An SVT-H transform as shown in FIG. 8 is allowed when the height of the residual block is in the range [a1, a2], as such values are defined above. SVT may be used for only the luma components in the residual block, or SVT may be employed for the luma and both chroma components in the residual block. When SVT is only used for the luma component, the luma component residual information is transformed by SVT and the chroma components are transformed by a transform the size of the residual block. When both SVT-V and SVT-H are allowed, a flag, such as a svt_type_flag, may be encoded into the bitstream. The svt_type_flag indicates whether SVT-V is used for the residual block (e.g., svt_type_flag is set to zero) or SVT-H is used for the residual block (e.g., svt_type_flag is set to one). Once the type of SVT transform is determined, the transform block size is set according to the signaled SVT type (e.g., w_t=w/2 and h_t=h for SVT-V, and w_t=w and h_t=h/2 for SVT-H). When only SVT-V is allowed or only SVT-H is allowed, the svt_type_flag may not be encoded into the bitstream. In such a case, the decoder can infer the transform block size based on the allowed SVT type.

Once the SVT type and size are determined, the decoder proceeds to block 1207. At block 1207, the decoder determines the position of the transform relative to the residual block as well as the type of the transform (e.g., either DST or DCT). The position of the transform block can be determined according to a syntax element in the bitstream. For example, a position index can be directly signaled and hence parsed from the bitstream in some examples. In other examples, the position can be inferred as discussed with respect to FIGS. 8-10. Specifically, candidate positions for the transform can be determined according to a CPSS function. The CPSS function can determine the candidate positions by considering the width of the residual block, the height of the residual block, the SVT type as determined by block 1205, the step size of the transform, and/or the portion of the residual block that the transform covers. The decoder can then determine the transform block position from the candidate positions by obtaining a p-index including a code that signals the correct candidate position according to candidate position selection probability as discussed with respect to FIG. 10 above. Once the transform block position is known, the decoder can infer the type of transform employed by the transform block as discussed with respect to FIG. 10 above. Accordingly, the encoder can select the corresponding inverse transform.

At block 1209, the decoder parses the transform coefficients of the transform block based on the transform block size determined at block 1205. This process may be accomplished according to transform coefficients parsing mechanisms employed in HEVC, H.264, and/or AVC. The transform coefficients may be coded using run-length coding and/or as a set of transform coefficient groups (CG). It should be noted that block 1209 may be performed before block 1207 in some examples.

At block 1211, the residual block is reconstructed based on the transform position, transform coefficients, and transform type as determined above. Specifically, inverse quantization and inverse transform of size w_t×h_t are applied to the transform coefficients to recover residual samples of the residual block. The size of the residual block with the residual samples is w_t×h_t. The inverse transform may be an inverse DCT or an inverse DST, according to the position-dependent transform type determined at block 1207. The residual samples are assigned to a corresponding region inside the residual block, according to the transform block position. Any residual samples inside the residual block and outside of the transform block may be set to zero. For example, when SVT-V is employed, the number of candidate positions is five and the position index indicates the fifth transform block position. As such, the reconstructed residual samples are assigned to a region (e.g., the shaded region in FIG. 9) in the transform candidate positions of the SVT examples 900 of FIG. 9 and the region of size (w/2)×h to the left of the region (e.g., the non-shaded region in FIG. 9) that has zero residual samples.

At optional block 1213, the residual block information of the reconstructed block may be horizontally flipped as discussed with respect to FIG. 11. As noted above, this may occur when the transform block at the decoder employs inverse DST, the right side neighbor block is already reconstructed, and left side neighbor is not already reconstructed. Specifically, the encoder may horizontally flip the residual block prior to applying a DST transform in the case mentioned above in order to increase coding efficiency. Accordingly, optional block 1213 may be employed to correct for such horizontal flipping at the encoder to create an accurate reconstructed block.

At block 1215, the reconstructed residual block may be composed with the prediction block to generate the reconstructed image block containing samples as part of a coding unit. A filtering process may also be applied on the reconstructed samples, such as deblocking filter and sample adaptive offset (SAO) processing in HEVC. The reconstructed image block may then be combined with other image blocks decoded in a similar fashion to generate frames of a media/video file. The reconstructed media file may then be displayed to a user on a monitor or other display device.

It should be noted that an equivalent implementation of method 1200 can be employed generate the reconstructed samples in the residual block. Specifically, the residual samples of the transform block can be composed directly with the prediction block at the position indicated by the transform block position information, without first recovering the residual block.

Figure 13:
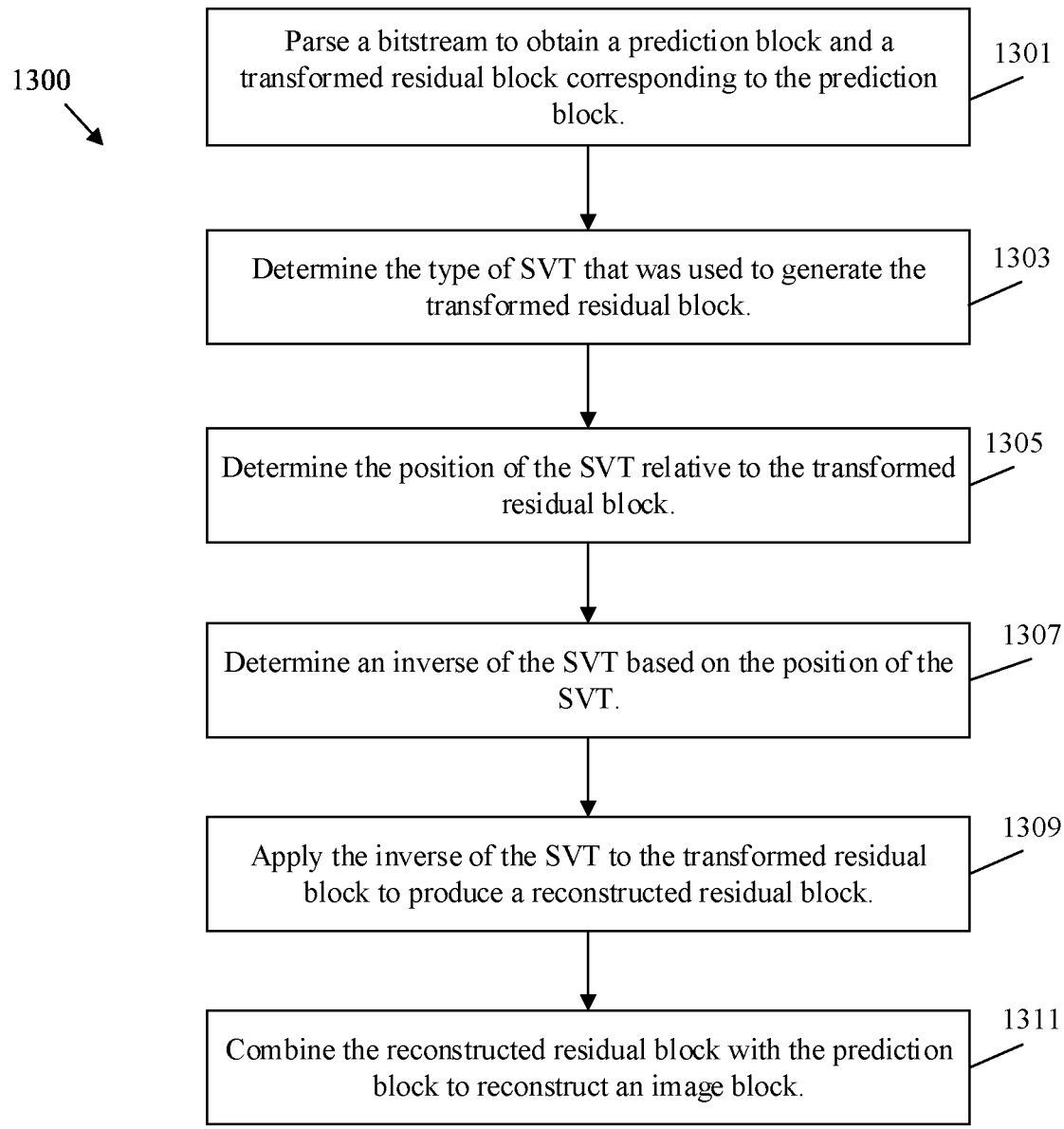
FIG. 13 is a flowchart of an example method of video coding.

FIG. 13 is a method 1300 of video coding. The method 1300 may be implemented in a decoder (e.g., video decoder 30). In particular, the method 1300 may be implemented by a processor of the decoder. The method 1300 may be implemented when a bitstream has been received directly or indirectly from an encoder (e.g., video encoder 20) or retrieved from a memory. At block 1301, a bitstream is parsed to obtain a prediction block (e.g., prediction block 603) and a transformed residual block (e.g., transformed residual block 609) corresponding to the prediction block. At block 1303, a type of SVT that was used to generate the transformed residual block is determined. As noted above, the type of SVT may be SVT-V or SVT-H. In an embodiment, the SVT-V type includes a height that equals a height of the transformed residual block and a width that is half a width of the transformed residual block.

In an embodiment, the SVT-H type includes a height that is half the height of the transformed residual block and a width that is equal to a width of the transformed residual block. In an embodiment, an svt_type_flag is parsed from the bitstream to determine the type of the SVT. In an embodiment, the type of SVT is determined by inference when only one type of SVT is allowed for the residual block.

At block 1305, a position of the SVT relative to the transformed residual block is determined. In an embodiment, a position index is parsed from the bitstream to determine the position of the SVT. In an embodiment, the position index contains a binary code indicating the position from a set of candidate positions determined according to the CPSS. In an embodiment, a most probable position of the SVT is assigned a least number of bits in the binary code indicating the position index. In an embodiment, a position of the SVT is inferred by the processor when a single candidate position is available for the SVT transform. In an embodiment, a position of the SVT is inferred by the processor when the residual block was generated by template matching in an inter-prediction mode.

At block 1307, an inverse of the SVT based on the position of the SVT is determined. In block 1309, the inverse of the SVT is applied to the transformed residual block to produce a reconstructed residual block (e.g., residual block 605). In an embodiment, the inverse DST is employed for an SVT-V type transform positioned at a left boundary of the residual block. In an embodiment, the inverse DST is employed for an SVT-H type transform positioned at a top boundary of the residual block. In an embodiment, an inverse DCT is employed for a SVT-V type transform positioned at a right boundary of the residual block. In an embodiment, an inverse DCT is employed for a SVT-H type transform positioned at a bottom boundary of the residual block.

At block 1311, the reconstructed residual block is combined with the prediction block to reconstruct an image block. In an embodiment, the image block is displayed on the display or monitor of an electronic device (e.g., smart phone, tablet, laptop computer, personal computer, etc.).

Optionally, the method 1300 may also include horizontally flipping samples in the reconstructed residual block prior to combining the reconstructed residual block with the prediction block when a right side neighbor of a coding unit associated with the reconstructed residual block has been reconstructed and a left side neighbor of the coding unit has not been reconstructed.

Figure 14:
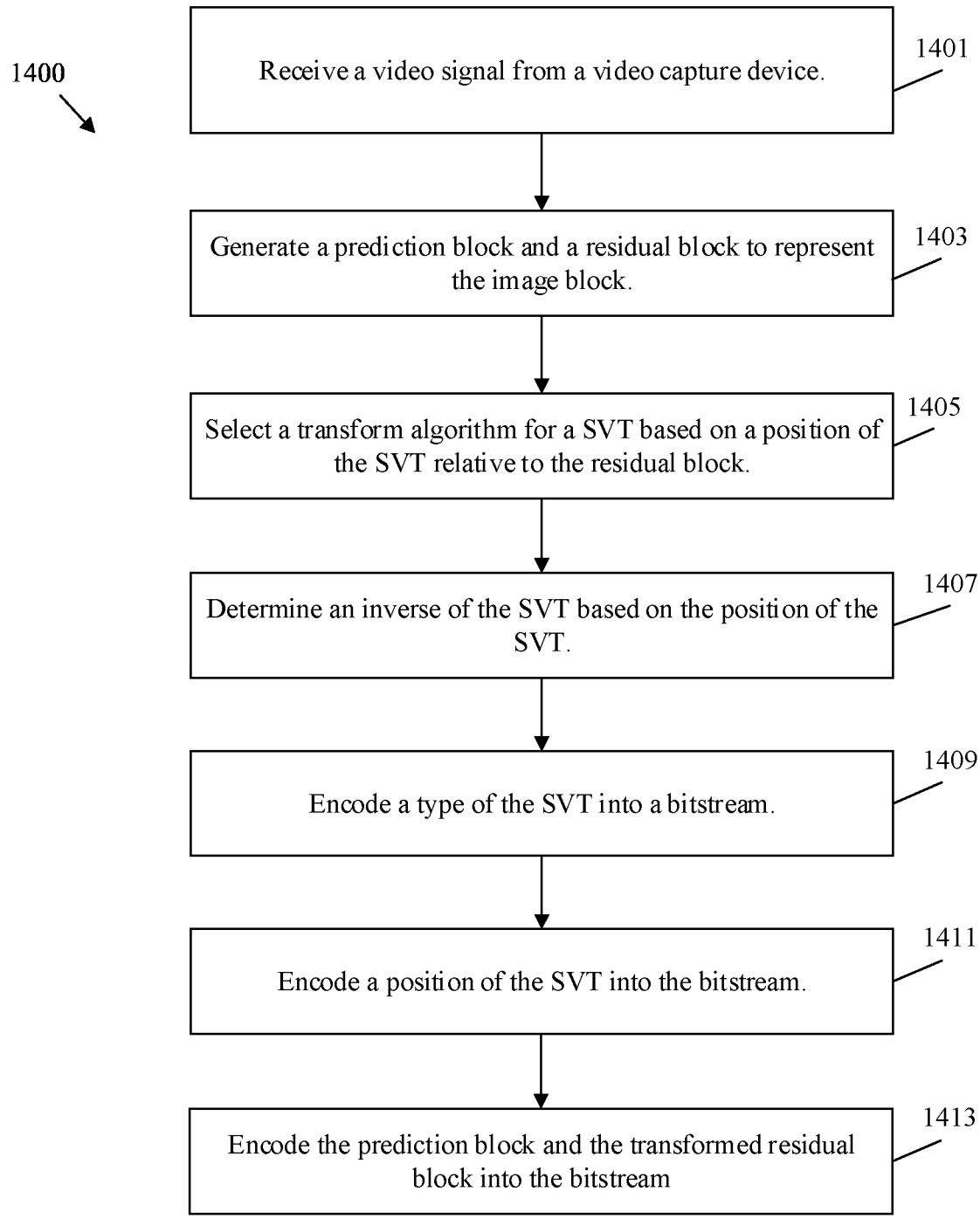
FIG. 14 is a flowchart of an example method of video coding.

FIG. 14 is a method 1400 of video coding. The method 1400 may be implemented in an encoder (e.g., video encoder 20). In particular, the method 1400 may be implemented by a processor of the encoder. The method 1400 may be implemented to encode a video signal. At block 1401, a video signal is received from a video capture device (e.g., a camera). In an embodiment, the video signal includes an image block (e.g., image block 601).

At block 1403, a prediction block (e.g., prediction block 603) and a residual block (e.g. residual block 605) are generated to represent the image block. At block 1405, a transform algorithm is selected for an SVT based on a position of the SVT relative to the residual block. At block 1407, the residual block is converted into a transformed residual block using the SVT that was selected.

At block 1409, a type of the SVT is encoded into a bitstream. In an embodiment, the type of the SVT is an SVT-V type or an SVT-H type. In an embodiment, the SVT-V type includes a height that equals a height of the residual block and a width that is half a width of the residual block. In an embodiment, the SVT_H type includes a height that is half the height of the residual block and a width that is equal to a width of the residual block.

At block 1411, a position of the SVT is encoded into the bitstream. In an embodiment, the position of the SVT is encoded in a position index. In an embodiment, the position index contains a binary code indicating the position from a set of candidate positions determined according to a CPSS. In an embodiment, a most probable position of the SVT is assigned as a least number of bits in the binary code indicating the position index.

In an embodiment, a DST algorithm is employed by the processor for an SVT-V type transform positioned at a left boundary of the residual block. In an embodiment, a DST algorithm is selected by the processor for an SVT-H type transform positioned at a top boundary of the residual block. In an embodiment, a DCT algorithm is selected by the processor for a SVT-V type transform positioned at a right boundary of the residual block. In an embodiment, a DCT algorithm is selected by the processor for a SVT-H type transform positioned at a bottom boundary of the residual block.

Optionally, the processor may horizontally flip samples in the residual block prior to converting the residual block into the transformed residual block when a right side neighbor of a coding unit associated with the residual block has been encoded and a left side neighbor of the coding unit has not been encoded.

At block 1413, the prediction block and the transformed residual block are encoded into the bitstream. In an embodiment, the bitstream is configured to be transmitted to a decoder and/or transmitted to the decoder.

Figure 15:
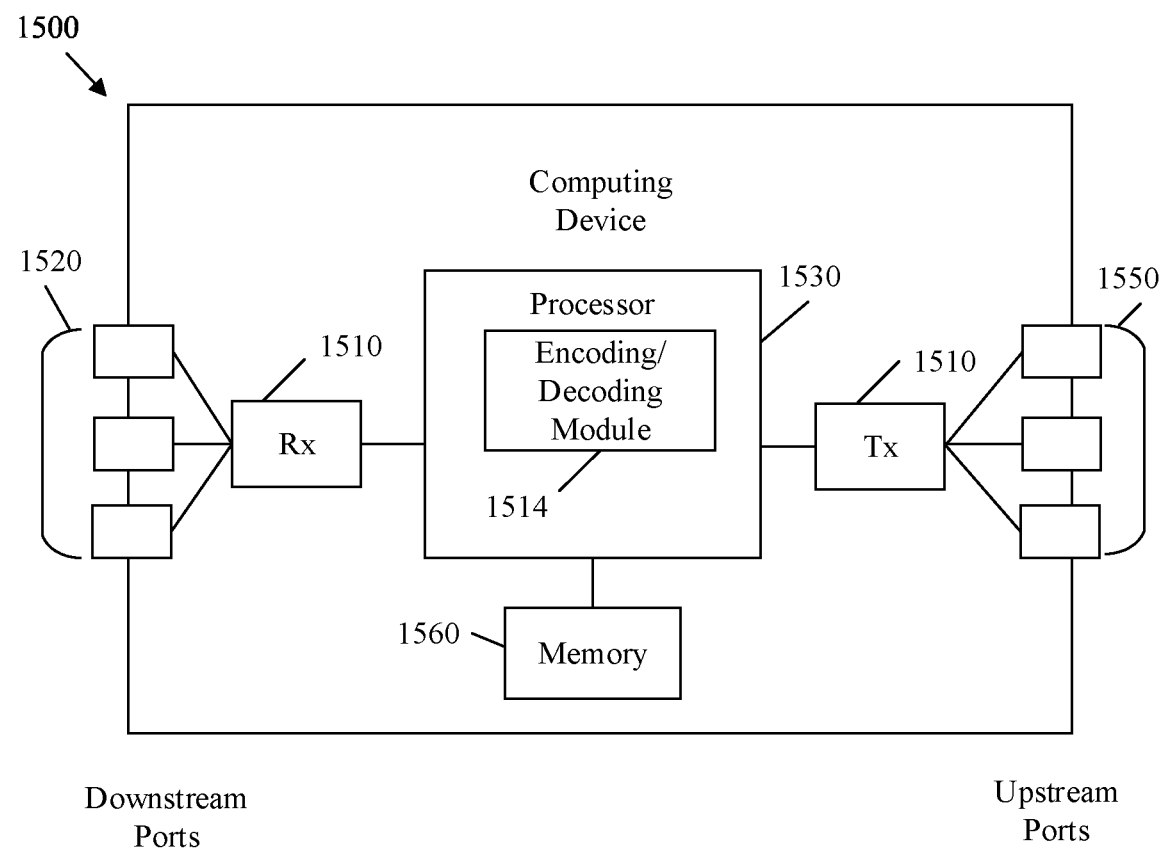
FIG. 15 is a schematic diagram of an example computing device for video coding.

FIG. 15 is a schematic diagram of an example computing device 1500 for video coding according to an embodiment of the disclosure. The computing device 1500 is suitable for implementing the disclosed embodiments as described herein. The computing device 1500 comprises ingress ports 1520 and receiver units (Rx) 1510 for receiving data; a processor, logic unit, or central processing unit (CPU) 1530 to process the data; transmitter units (Tx) 1540 and egress ports 1550 for transmitting the data; and a memory 1560 for storing the data. The computing device 1500 may also comprise optical-to-electrical (OE) components and electrical-to-optical (EO) components coupled to the ingress ports 1520, the receiver units 1510, the transmitter units 1540, and the egress ports 1550 for egress or ingress of optical or electrical signals. The computing device 1500 may also include wireless transmitters and/or receivers in some examples.

The processor 1530 is implemented by hardware and software. The processor 1530 may be implemented as one or more CPU chips, cores (e.g., as a multi-core processor), field-programmable gate arrays (FPGAs), application specific integrated circuits (ASICs), and digital signal processors (DSPs). The processor 1530 is in communication with the ingress ports 1520, receiver units 1510, transmitter units 1540, egress ports 1550, and memory 1560. The processor 1530 comprises an encoding/decoding module 1514. The encoding/decoding module 1514 implements the disclosed embodiments described above, such as method 1300 and method 1400 and other mechanisms for encoding/reconstructing a residual block based on transform block position when employing SVT as well as any other mechanisms described hereinabove. For instance, the encoding/decoding module 1514 implements, processes, prepares, or provides the various coding operations such as encoding video data and/or decoding video data as discussed above. The inclusion of the encoding/decoding module 1514 therefore provides a substantial improvement to the functionality of the computing device 1500 and effects a transformation of the computing device 1500 to a different state. Alternatively, the encoding/decoding module 1514 is implemented as instructions stored in the memory 1560 and executed by the processor 1530 (e.g., as a computer program product stored on a non-transitory medium).

The memory 1560 comprises one or more disks, tape drives, and solid-state drives and may be used as an overflow data storage device, to store programs when such programs are selected for execution, and to store instructions and data that are read during program execution. The memory 1560 may be volatile and/or non-volatile and may be read-only memory (ROM), random access memory (RAM), ternary content-addressable memory (TCAM), and/or static random-access memory (SRAM). The computing device 1500 may also comprise input/output (I/O) device for interacting with an end user. For example, the computing device 1500 may include a display, such as a monitor, for visual output, speakers for audio output, and a keyboard/mouse/trackball, etc. for user input.

In summary, the above disclosure includes mechanisms that adaptively employ multiple transform types for transform block at different positions. Further, the disclosure allows for horizontally flipping the residual samples in the residual block to support coding efficiency. This occurs when the transform block uses DST and inverse DST at the encoder and decoder, respectively and when the right neighbor block is available and the left neighbor is not available. Further, the disclosure includes mechanisms to support coding position information in the bitstream based on the inter-prediction mode associated with the residual block.

Figure 16:
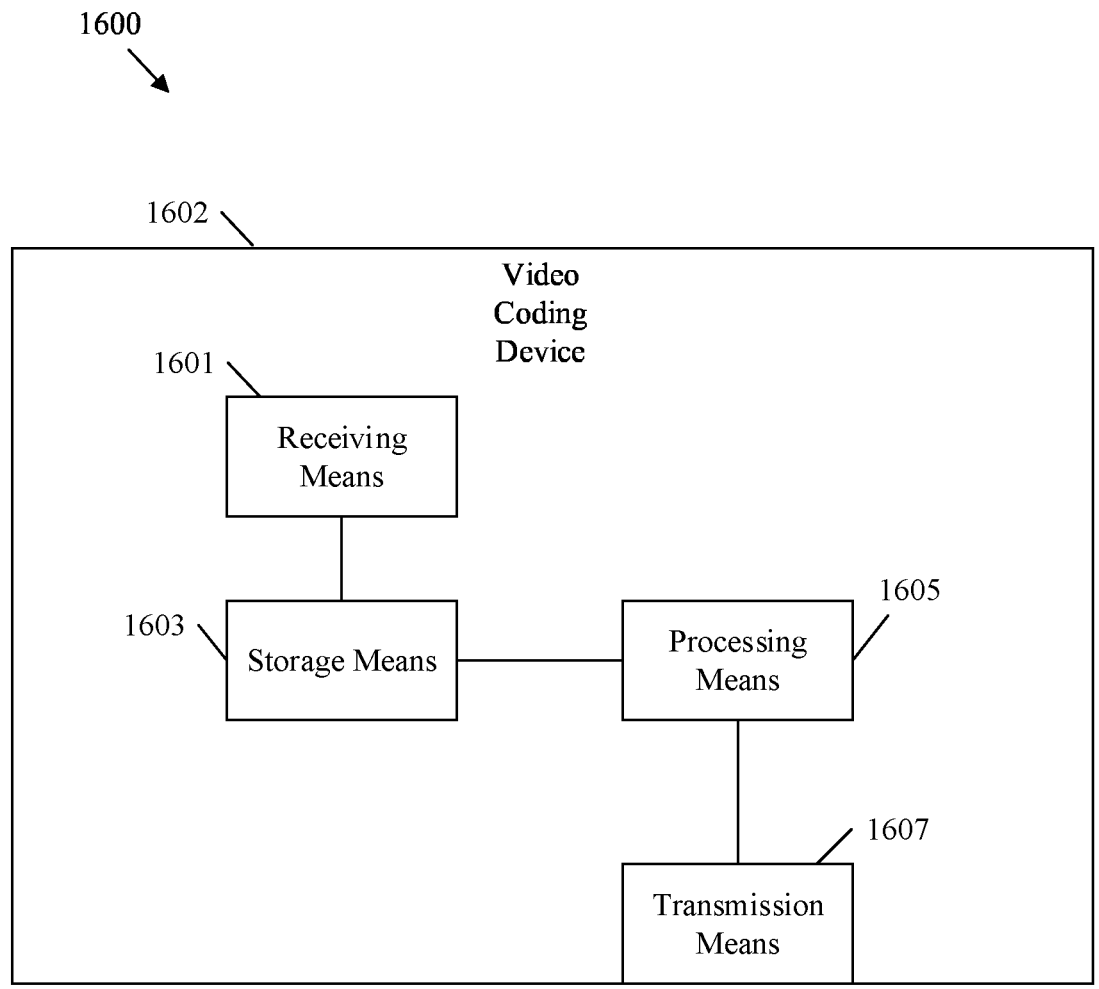
FIG. 16 is a schematic diagram of an embodiment of a means for coding.

FIG. 16 is a schematic diagram of an embodiment of a means for coding 1600. In embodiment, the means for coding 1600 is implemented in a video coding device 1602 (e.g., video encoder 20 or video decoder 30). The video coding device 1602 includes receiving means 1601. The receiving means 1601 is configured to receive a picture to encode or to receive a bitstream to decode. The video coding device 1602 includes transmission means 1607 coupled to the receiving means 1601. The transmission means 1607 is configured to transmit the bitstream to a decoder or to transmit a decoded image to a display means (e.g., one of the I/O devices in the computing device 1500).

The video coding device 1602 includes a storage means 1603. The storage means 1603 is coupled to at least one of the receiving means 1601 or the transmission means 1607. The storage means 1603 is configured to store instructions. The video coding device 1602 also includes processing means 1605. The processing means 1605 is coupled to the storage means 1603. The processing means 1605 is configured to execute the instructions stored in the storage means 1603 to perform the methods disclosed herein.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a coding device, comprising:
    obtaining a prediction block and a transformed residual block corresponding to the prediction block;
    parsing a flag from a bitstream to determine a type of spatial varying transform (SVT) used for the transformed residual block, wherein the type of the SVT is a SVT vertical (SVT-V) type or a SVT horizontal (SVT-H) type;
    applying an inverse of the SVT to the transformed residual block to produce a reconstructed residual block, wherein the inverse of the SVT is based on a position of a block of the SVT relative to the transformed residual block, wherein the inverse of the SVT includes inverse discrete sine transform version seven (DST-7) when the position of the SVT covers a bottom-right corner of the transformed residual block, and wherein the inverse of the SVT includes inverse discrete cosine transform version eight (DCT-8) when the position of the SVT covers a top-left corner of the transformed residual block; and
    combining the reconstructed residual block with the prediction block to reconstruct an image block.

2. The method of claim 1, wherein the SVT type is the SVT-V type, and the SVT-V type includes a height that equals a height of the transformed residual block and a width that is half a width of the transformed residual block.

3. The method of claim 1, wherein the SVT type is the SVT-H type, and the SVT-H type includes a height that is half the height of the transformed residual block and a width that is equal to a width of the transformed residual block.

4. The method of claim 1, wherein the bitstream includes a position index used to determine the position of the SVT.

5. The method of claim 1, wherein the bitstream includes a position index that contains a binary code indicating the position from a set of candidate positions determined according to a candidate position step size (CPSS).

6. The method of claim 1, wherein the inverse of the SVT is not exact.

7. The method of claim 1, wherein the position of the SVT covers the bottom-right corner of the transformed residual block.

8. The method of claim 1, wherein the position of the SVT covers the top-left corner of the transformed residual block.

9. A method implemented by a coding device, comprising:
    obtaining video data and a prediction block corresponding to the video data;
    generating a bitstream using the video data, wherein the bitstream comprises a transformed residual block corresponding to the prediction block, and a flag indicating a type of spatial varying transform (SVT) used for the transformed residual block, and wherein the type of the SVT is a SVT vertical (SVT-V) type or a SVT horizontal (SVT-H) type, and wherein the transformed residual block is configured such that an inverse of the SVT can be applied to the transformed residual block to produce a reconstructed residual block, wherein the inverse of the SVT is based on a position of a block of the SVT relative to the transformed residual block, wherein the inverse of the SVT includes inverse discrete sine transform version seven (DST-7) when the position of the SVT covers a bottom-right corner of the transformed residual block, or wherein the inverse of the SVT includes inverse discrete cosine transform version eight (DCT-8) when the position of the SVT covers a top-left corner of the transformed residual block; and
    storing the bitstream for transmission toward a decoder.

10. The method of claim 9, further comprising using a Discrete Sine Transform (DST) algorithm for the SVT-V type transform positioned at a left boundary of a residual block.

11. The method of claim 9, further comprising using a Discrete Sine Transform (DST) algorithm for the SVT-H type transform positioned at a top boundary of a residual block.

12. The method of claim 9, further comprising using a Discrete Cosine Transform (DCT) algorithm for the SVT-V type transform positioned at a right boundary of a residual block.

13. The method of claim 9, further comprising using a Discrete Cosine Transform (DCT) algorithm for the SVT-H type transform positioned at a bottom boundary of a residual block.

14. A non-transitory computer-readable medium storing a bitstream comprising compressed video data and syntax elements indicating processing of blocks, said syntax elements configured to instruct a decoding device comprising a processor such that the decoding device is configured to perform the indicated processing of blocks, wherein the compressed video data comprises:
a transformed residual block corresponding to a prediction block; and wherein the syntax elements comprise:
a flag indicating a type of spatial varying transform (SVT) used for the transformed residual block stored in the compressed video data, wherein the type of the SVT is a SVT vertical (SVT-V) type or a SVT horizontal (SVT-H) type, wherein the transformed residual block is configured to produce a reconstructed residual block when an inverse of the SVT is applied, wherein the inverse of the SVT is based on a position of a block of the SVT relative to the transformed residual block, wherein the inverse of the SVT includes inverse discrete sine transform version seven (DST-7) when the position of the SVT covers a bottom-right corner of the transformed residual block, or wherein the inverse of the SVT includes inverse discrete cosine transform version eight (DCT-8) when the position of the SVT covers a top-left corner of the transformed residual block, and wherein the processing of blocks comprises:
applying the inverse of the SVT; and
producing the reconstructed residual block.

15. The non-transitory computer readable medium of claim 14, wherein the SVT type is the SVT-V type, and the SVT-V type includes a height that equals a height of the transformed residual block and a width that is half a width of the transformed residual block.

16. The non-transitory computer readable medium of claim 14, wherein the SVT type is the SVT-H type, and the SVT-H type includes a height that is half the height of the transformed residual block and a width that is equal to a width of the transformed residual block.

17. The non-transitory computer readable medium of claim 14, wherein the bitstream includes a position index used to determine the position of the SVT.

18. The non-transitory computer readable medium of claim 14, wherein the bitstream includes a position index that contains a binary code indicating the position from a set of candidate positions determined according to a candidate position step size (CPSS).

19. The non-transitory computer readable medium of claim 14, wherein the inverse of the SVT is not exact.

\* \* \* \* \*